(12) United States Patent
Shalvi et al.

(10) Patent No.: US 8,156,403 B2
(45) Date of Patent: Apr. 10, 2012

(54) COMBINED DISTORTION ESTIMATION AND ERROR CORRECTION CODING FOR MEMORY DEVICES

(75) Inventors: Ofir Shalvi, Ra'anana (IL); Naftali Sommer, Rishon Le-Zion (IL); Ariel Maislos, Sunnyvale, CA (US); Dotan Sokolov, Ra'anana (IL)

(73) Assignee: Anobit Technologies Ltd., Herzliya (IL)

( * ) Notice: Subject to any disclaimer, the term of this patent is extended or adjusted under 35 U.S.C. 154(b) by 818 days.

(21) Appl. No.: 11/996,054

(22) PCT Filed: May 10, 2007

(86) PCT No.: PCT/IL2007/000580
§ 371 (c)(1),
(2), (4) Date: Jan. 17, 2008

(87) PCT Pub. No.: WO2007/132457
PCT Pub. Date: Nov. 22, 2007

(65) Prior Publication Data
US 2009/0024905 A1    Jan. 22, 2009

Related U.S. Application Data

(60) Provisional application No. 60/747,106, filed on May 12, 2006, provisional application No. 60/863,480, filed on Oct. 30, 2006, provisional application No. 60/863,810, filed on Nov. 1, 2006, provisional application No. 60/867,399, filed on Nov. 28, 2006, provisional application No. 60/885,024, filed on Jan. 16, 2007, provisional application No. 60/886,102, filed on Jan. 23, 2007, provisional application No. 60/892,869, filed on Mar. 4, 2007, provisional application No. 60/894,290, filed on Mar. 12, 2007, provisional application No. 60/894,456, filed on Mar. 13, 2007.

(51) Int. Cl.
*G11C 29/00* (2006.01)
(52) U.S. Cl. ........................................ 714/764; 714/794
(58) Field of Classification Search .................. 341/118; 365/185.21, 45; 714/763, 769, 774, 764, 714/794
See application file for complete search history.

(56) References Cited

U.S. PATENT DOCUMENTS 3,668,631 A    6/1972 Griffith et al.
(Continued)

FOREIGN PATENT DOCUMENTS

EP    0783754 B1    7/1997
(Continued)

OTHER PUBLICATIONS

U.S. Appl. No. 11/995,814 Official Action dated Dec. 17, 2010.
(Continued)

*Primary Examiner* — David Ton
(74) *Attorney, Agent, or Firm* — D. Kligler IP Services Ltd.

(57) ABSTRACT

A method for operating a memory device (24) includes encoding data using an Error Correction Code (ECC) and storing the encoded data as first analog values in respective analog memory cells (32) of the memory device. After storing the encoded data, second analog values are read from the respective memory cells of the memory device in which the encoded data were stored. At least some of the second analog values differ from the respective first analog values. A distortion that is present in the second analog values is estimated. Error correction metrics are computed with respect to the second analog values responsively to the estimated distortion. The second analog values are processed using the error correction metrics in an ECC decoding process, so as to reconstruct the data.

88 Claims, 5 Drawing Sheets

U.S. PATENT DOCUMENTS

| | | | |
|---|---|---|---|
| 3,668,632 A | 6/1972 | Oldham |
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,556,961 A | 12/1985 | Iwahashi et al. |
| 4,558,431 A | 12/1985 | Satoh |
| 4,608,687 A | 8/1986 | Dutton |
| 4,654,847 A | 3/1987 | Dutton |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |
| 5,056,089 A | 10/1991 | Furuta et al. |
| 5,077,722 A | 12/1991 | Geist et al. |
| 5,126,808 A | 6/1992 | Montalvo et al. |
| 5,163,021 A | 11/1992 | Mehrotra et al. |
| 5,172,338 A | 12/1992 | Mehrotta et al. |
| 5,182,558 A * | 1/1993 | Mayo ........................... 341/118 |
| 5,182,752 A | 1/1993 | DeRoo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koning |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 * | 7/2001 | Wong ........................ 365/185.21 |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 * | 9/2002 | Kokudo et al. .................. 365/45 |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzales et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |

| Patent | Kind | Date | Inventor |
|---|---|---|---|
| 6,738,293 | B1 | 5/2004 | Iwahashi |
| 6,751,766 | B2 | 6/2004 | Guterman et al. |
| 6,757,193 | B2 | 6/2004 | Chen et al. |
| 6,774,808 | B1 | 8/2004 | Hibbs et al. |
| 6,781,877 | B2 | 8/2004 | Cernea et al. |
| 6,804,805 | B2 | 10/2004 | Rub |
| 6,807,095 | B2 | 10/2004 | Chen et al. |
| 6,807,101 | B2 | 10/2004 | Ooishi et al. |
| 6,809,964 | B2 | 10/2004 | Moschopoulos et al. |
| 6,819,592 | B2 | 11/2004 | Noguchi et al. |
| 6,829,167 | B2 | 12/2004 | Tu et al. |
| 6,845,052 | B1 | 1/2005 | Ho et al. |
| 6,851,018 | B2 | 2/2005 | Wyatt et al. |
| 6,851,081 | B2 | 2/2005 | Yamamoto |
| 6,856,546 | B2 | 2/2005 | Guterman et al. |
| 6,862,218 | B2 | 3/2005 | Guterman et al. |
| 6,870,767 | B2 | 3/2005 | Rudelic et al. |
| 6,870,773 | B2 | 3/2005 | Noguchi et al. |
| 6,873,552 | B2 | 3/2005 | Ishii et al. |
| 6,879,520 | B2 | 4/2005 | Hosono et al. |
| 6,882,567 | B1 | 4/2005 | Wong |
| 6,894,926 | B2 | 5/2005 | Guterman et al. |
| 6,907,497 | B2 | 6/2005 | Hosono et al. |
| 6,925,009 | B2 | 8/2005 | Noguchi et al. |
| 6,930,925 | B2 | 8/2005 | Guo et al. |
| 6,934,188 | B2 | 8/2005 | Roohparvar |
| 6,937,511 | B2 | 8/2005 | Hsu et al. |
| 6,958,938 | B2 | 10/2005 | Noguchi et al. |
| 6,963,505 | B2 | 11/2005 | Cohen |
| 6,972,993 | B2 | 12/2005 | Conley et al. |
| 6,988,175 | B2 | 1/2006 | Lasser |
| 6,992,932 | B2 | 1/2006 | Cohen |
| 6,999,344 | B2 | 2/2006 | Hosono et al. |
| 7,002,843 | B2 | 2/2006 | Guterman et al. |
| 7,006,379 | B2 | 2/2006 | Noguchi et al. |
| 7,012,835 | B2 | 3/2006 | Gonzales et al. |
| 7,020,017 | B2 | 3/2006 | Chen et al. |
| 7,023,735 | B2 | 4/2006 | Ban et al. |
| 7,031,210 | B2 | 4/2006 | Park et al. |
| 7,031,214 | B2 | 4/2006 | Tran |
| 7,031,216 | B2 | 4/2006 | You |
| 7,039,846 | B2 | 5/2006 | Hewitt et al. |
| 7,042,766 | B1 | 5/2006 | Wang et al. |
| 7,054,193 | B1 | 5/2006 | Wong |
| 7,054,199 | B2 | 5/2006 | Lee et al. |
| 7,057,958 | B2 | 6/2006 | So et al. |
| 7,065,147 | B2 | 6/2006 | Ophir et al. |
| 7,068,539 | B2 | 6/2006 | Guterman et al. |
| 7,071,849 | B2 | 7/2006 | Zhang |
| 7,072,222 | B2 | 7/2006 | Ishii et al. |
| 7,079,555 | B2 | 7/2006 | Baydar et al. |
| 7,088,615 | B2 | 8/2006 | Guterman et al. |
| 7,099,194 | B2 | 8/2006 | Tu et al. |
| 7,102,924 | B2 | 9/2006 | Chen et al. |
| 7,113,432 | B2 | 9/2006 | Mokhlesi |
| 7,130,210 | B2 | 10/2006 | Bathul et al. |
| 7,139,192 | B1 | 11/2006 | Wong |
| 7,139,198 | B2 | 11/2006 | Guterman et al. |
| 7,145,805 | B2 | 12/2006 | Ishii et al. |
| 7,151,692 | B2 | 12/2006 | Wu |
| 7,170,781 | B2 | 1/2007 | So et al. |
| 7,170,802 | B2 | 1/2007 | Cernea et al. |
| 7,173,859 | B2 | 2/2007 | Hemink |
| 7,177,184 | B2 | 2/2007 | Chen |
| 7,177,195 | B2 | 2/2007 | Gonzales et al. |
| 7,177,199 | B2 | 2/2007 | Chen et al. |
| 7,177,200 | B2 | 2/2007 | Ronen et al. |
| 7,184,338 | B2 | 2/2007 | Nakagawa et al. |
| 7,187,195 | B2 | 3/2007 | Kim |
| 7,187,592 | B2 | 3/2007 | Guterman et al. |
| 7,190,614 | B2 | 3/2007 | Wu |
| 7,193,898 | B2 | 3/2007 | Cernea |
| 7,193,921 | B2 | 3/2007 | Choi et al. |
| 7,196,644 | B1 | 3/2007 | Anderson et al. |
| 7,196,928 | B2 | 3/2007 | Chen |
| 7,196,933 | B2 | 3/2007 | Shibata |
| 7,197,594 | B2 | 3/2007 | Raz et al. |
| 7,200,062 | B2 | 4/2007 | Kinsely et al. |
| 7,210,077 | B2 | 4/2007 | Brandenberger et al. |
| 7,221,592 | B2 | 5/2007 | Nazarian |
| 7,224,613 | B2 | 5/2007 | Chen et al. |
| 7,231,474 | B1 | 6/2007 | Helms et al. |
| 7,231,562 | B2 | 6/2007 | Ohlhoff et al. |
| 7,243,275 | B2 | 7/2007 | Gongwer et al. |
| 7,254,690 | B2 | 8/2007 | Rao |
| 7,254,763 | B2 | 8/2007 | Aadsen et al. |
| 7,257,027 | B2 | 8/2007 | Park |
| 7,259,987 | B2 | 8/2007 | Chen et al. |
| 7,266,026 | B2 | 9/2007 | Gongwer et al. |
| 7,266,069 | B2 | 9/2007 | Chu |
| 7,269,066 | B2 | 9/2007 | Nguyen et al. |
| 7,272,757 | B2 | 9/2007 | Stocken |
| 7,274,611 | B2 | 9/2007 | Roohparvar |
| 7,277,355 | B2 | 10/2007 | Tanzana |
| 7,280,398 | B1 | 10/2007 | Lee et al. |
| 7,280,409 | B2 | 10/2007 | Misumi et al. |
| 7,280,415 | B2 | 10/2007 | Hwang et al. |
| 7,283,399 | B2 | 10/2007 | Ishii et al. |
| 7,289,344 | B2 | 10/2007 | Chen |
| 7,301,807 | B2 | 11/2007 | Khalid et al. |
| 7,301,817 | B2 | 11/2007 | Li et al. |
| 7,308,525 | B2 | 12/2007 | Lasser et al. |
| 7,310,255 | B2 | 12/2007 | Chan |
| 7,310,269 | B2 | 12/2007 | Shibata |
| 7,310,271 | B2 | 12/2007 | Lee |
| 7,310,272 | B1 | 12/2007 | Mokhlesi et al. |
| 7,310,347 | B2 | 12/2007 | Lasser |
| 7,321,509 | B2 | 1/2008 | Chen et al. |
| 7,328,384 | B1 | 2/2008 | Kulkarni et al. |
| 7,342,831 | B2 | 3/2008 | Mokhlesi et al. |
| 7,343,330 | B1 | 3/2008 | Boesjes et al. |
| 7,345,924 | B2 | 3/2008 | Nguyen et al. |
| 7,345,928 | B2 | 3/2008 | Li |
| 7,349,263 | B2 | 3/2008 | Kim et al. |
| 7,356,755 | B2 | 4/2008 | Fackenthal |
| 7,363,420 | B2 | 4/2008 | Lin et al. |
| 7,365,671 | B1 | 4/2008 | Anderson |
| 7,388,781 | B2 | 6/2008 | Litsyn et al. |
| 7,397,697 | B2 | 7/2008 | So et al. |
| 7,405,974 | B2 | 7/2008 | Yaoi et al. |
| 7,405,979 | B2 | 7/2008 | Ishii et al. |
| 7,408,804 | B2 | 8/2008 | Hemink et al. |
| 7,408,810 | B2 | 8/2008 | Aritome et al. |
| 7,409,473 | B2 | 8/2008 | Conley et al. |
| 7,409,623 | B2 | 8/2008 | Baker et al. |
| 7,420,847 | B2 | 9/2008 | Li |
| 7,433,231 | B2 | 10/2008 | Aritome |
| 7,433,697 | B2 | 10/2008 | Karaoguz et al. |
| 7,434,111 | B2 | 10/2008 | Sugiura et al. |
| 7,437,498 | B2 | 10/2008 | Ronen |
| 7,440,324 | B2 | 10/2008 | Mokhlesi |
| 7,440,331 | B2 | 10/2008 | Hemink |
| 7,441,067 | B2 | 10/2008 | Gorobetz et al. |
| 7,447,970 | B2 | 11/2008 | Wu et al. |
| 7,450,421 | B2 | 11/2008 | Mokhlesi et al. |
| 7,453,737 | B2 | 11/2008 | Ha |
| 7,457,163 | B2 | 11/2008 | Hemink |
| 7,457,897 | B1 | 11/2008 | Lee et al. |
| 7,460,410 | B2 | 12/2008 | Nagai et al. |
| 7,460,412 | B2 | 12/2008 | Lee et al. |
| 7,466,592 | B2 | 12/2008 | Mitani et al. |
| 7,468,907 | B2 | 12/2008 | Kang et al. |
| 7,468,911 | B2 | 12/2008 | Lutze et al. |
| 7,471,581 | B2 | 12/2008 | Tran et al. |
| 7,483,319 | B2 | 1/2009 | Brown |
| 7,487,329 | B2 | 2/2009 | Hepkin et al. |
| 7,492,641 | B2 | 2/2009 | Hosono et al. |
| 7,508,710 | B2 | 3/2009 | Mokhlesi |
| 7,526,711 | B2 | 4/2009 | Orio |
| 7,539,061 | B2 | 5/2009 | Lee |
| 7,539,062 | B2 | 5/2009 | Doyle |
| 7,551,492 | B2 | 6/2009 | Kim |
| 7,558,109 | B2 | 7/2009 | Brandman et al. |
| 7,558,839 | B1 | 7/2009 | McGovern |
| 7,568,135 | B2 | 7/2009 | Cornwell et al. |
| 7,570,520 | B2 | 8/2009 | Kamei et al. |
| 7,590,002 | B2 | 9/2009 | Mokhlesi et al. |
| 7,593,259 | B2 | 9/2009 | Kim |

| Patent/Pub No. | Date | Inventor |
|---|---|---|
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,810,017 B2 | 10/2010 | Radke |
| 7,848,149 B2 | 12/2010 | Gonzales et al. |
| 7,869,273 B2 | 1/2011 | Lee et al. |
| 7,885,119 B2 | 2/2011 | Li |
| 7,928,497 B2 | 4/2011 | Yaegashi |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobets |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |

| | | | |
|---|---|---|---|
| 2008/0209116 A1 | 8/2008 | Caulkins | |
| 2008/0209304 A1 | 8/2008 | Winarski et al. | |
| 2008/0215798 A1 | 9/2008 | Sharon et al. | |
| 2008/0219050 A1 | 9/2008 | Shalvi et al. | |
| 2008/0239093 A1 | 10/2008 | Easwar et al. | |
| 2008/0239812 A1 | 10/2008 | Abiko et al. | |
| 2008/0253188 A1 | 10/2008 | Aritome | |
| 2008/0263262 A1 | 10/2008 | Sokolov et al. | |
| 2008/0263676 A1 | 10/2008 | Mo et al. | |
| 2008/0270730 A1 | 10/2008 | Lasser et al. | |
| 2008/0282106 A1 | 11/2008 | Shalvi et al. | |
| 2008/0288714 A1 | 11/2008 | Salomon et al. | |
| 2009/0013233 A1 | 1/2009 | Radke | |
| 2009/0024905 A1 | 1/2009 | Shalvi et al. | |
| 2009/0034337 A1 | 2/2009 | Aritome | |
| 2009/0043831 A1 | 2/2009 | Antonopoulos et al. | |
| 2009/0043951 A1 | 2/2009 | Shalvi et al. | |
| 2009/0049234 A1 | 2/2009 | Oh et al. | |
| 2009/0073762 A1 | 3/2009 | Lee et al. | |
| 2009/0086542 A1 | 4/2009 | Lee et al. | |
| 2009/0089484 A1 | 4/2009 | Chu | |
| 2009/0091979 A1 | 4/2009 | Shalvi | |
| 2009/0094930 A1 | 4/2009 | Schwoerer | |
| 2009/0106485 A1 | 4/2009 | Anholt | |
| 2009/0112949 A1 | 4/2009 | Ergan et al. | |
| 2009/0132755 A1 | 5/2009 | Radke | |
| 2009/0144600 A1 | 6/2009 | Perlmutter et al. | |
| 2009/0150894 A1 | 6/2009 | Huang et al. | |
| 2009/0157950 A1 | 6/2009 | Selinger | |
| 2009/0172257 A1 | 7/2009 | Prins et al. | |
| 2009/0172261 A1 | 7/2009 | Prins et al. | |
| 2009/0193184 A1 | 7/2009 | Yu et al. | |
| 2009/0204824 A1 | 8/2009 | Lin et al. | |
| 2009/0204872 A1 | 8/2009 | Yu et al. | |
| 2009/0225595 A1 | 9/2009 | Kim | |
| 2009/0265509 A1 | 10/2009 | Klein | |
| 2009/0300227 A1 | 12/2009 | Nochimowski et al. | |
| 2009/0323412 A1 | 12/2009 | Mokhlesi et al. | |
| 2009/0327608 A1 | 12/2009 | Eschmann | |
| 2010/0017650 A1 | 1/2010 | Chin et al. | |
| 2010/0034022 A1 | 2/2010 | Dutta et al. | |
| 2010/0057976 A1 | 3/2010 | Lasser | |
| 2010/0061151 A1 | 3/2010 | Miwa et al. | |
| 2010/0082883 A1 | 4/2010 | Chen et al. | |
| 2010/0083247 A1 | 4/2010 | Kanevsky et al. | |
| 2010/0110580 A1 | 5/2010 | Takashima | |
| 2010/0131697 A1 | 5/2010 | Alrod et al. | |
| 2010/0142268 A1 | 6/2010 | Aritome | |
| 2010/0142277 A1 | 6/2010 | Yang et al. | |
| 2010/0169547 A1 | 7/2010 | Ou | |
| 2010/0169743 A1 | 7/2010 | Vogan et al. | |
| 2010/0174847 A1 | 7/2010 | Paley et al. | |
| 2011/0066793 A1 | 3/2011 | Burd | |
| 2011/0075482 A1 | 3/2011 | Shepard et al. | |
| 2011/0107049 A1 | 5/2011 | Kwon et al. | |
| 2011/0199823 A1 | 8/2011 | Bar-Or et al. | |
| 2011/0302354 A1 | 12/2011 | Miller | |

FOREIGN PATENT DOCUMENTS

| | | |
|---|---|---|
| EP | 1434236 B1 | 6/2004 |
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 12/388,528 Official Action dated Nov. 29, 2010.
U.S. Appl. No. 12/251,471 Official Action dated Jan. 3, 2011.
Engineering Windows 7, "Support and Q&A for Solid-State Drives", e7blog, May 5, 2009.
Micron Technology Inc., "Memory Management in NAND Flash Arrays", Technical Note, year 2005.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Park et al., "Sub-Grouped Superblock Management for High-Performance Flash Storages", IEICE Electronics Express, vol. 6, No. 6, pp. 297-303, Mar. 25, 2009.
"How to Resolve "Bad Super Block: Magic Number Wrong" in BSD", Free Online Articles Director Article Base, posted Sep. 5, 2009.
Ubuntu Forums, "Memory Stick Failed IO Superblock", posted Nov. 11, 2009.
Super User Forums, "SD Card Failure, can't read superblock", posted Aug. 8, 2010.
U.S. Appl. No. 12/987,174 "Redundant Data Storage in Multi-Die Memory Systems", filed on Jan. 10, 2011.
U.S. Appl. No. 12/987,175 "Redundant Data Storage Schemes for Multi-Die Memory Systems" filed on Jan. 10, 2011.
U.S. Appl. No. 12/963,649 "Memory Management Schemes for Non-Volatile Memory Devices" filed on Dec. 9, 2010.
U.S. Appl. No. 13/021,754 "Reducing Peak Current in Memory Systems" filed on Feb. 6, 2011.
U.S. Appl. No. 12/019,011 Official Action dated Nov. 20, 2009.
Takeuchi et al., "A Multipage Cell Architecture for High-Speed Programming Multilevel NAND Flash Memories", IEEE Journal of Solid State Circuits, vol. 33, No. 8, Aug. 1998.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
JEDEC Standard JESD84-C44, "Embedded MultiMediaCard (e•MMC) Mechanical Standard, with Optional Reset Signal", Jedec Solid State Technology Association, USA, Jul. 2009.
JEDEC, "UFS Specification", version 0.1, Nov. 11, 2009.
SD Group and SD Card Association, "SD Specifications Part 1 Physical Layer Specification", version 3.01, draft 1.00, Nov. 9, 2009.
Compaq et al., "Universal Serial Bus Specification", revision 2.0, Apr. 27, 2000.
Serial ATA International Organization, "Serial ATA Revision 3.0 Specification", Jun. 2, 2009.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.

Agrell et al., "Closest Point Search in Lattices", IEEE Transactions on Information Theory, vol. 48, No. 8, pp. 2201-2214, Aug. 2002.
Blahut, R.E., "Theory and Practice of Error Control Codes," Addison-Wesley, May 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Engh et al., "A self adaptive programming method with 5 mV accuracy for multi-level storage in FLASH", pp. 115-118, Proceedings of the IEEE 2002 Custom Integrated Circuits Conference, May 12-15, 2002.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, p. 103-112, Springer Berlin / Heidelberg, Aug. 25, 2006.
Horstein, "On the Design of Signals for Sequential and Nonsequential Detection Systems with Feedback," IEEE Transactions on Information Theory IT-12:4 (Oct. 1966), pp. 448-455.
Kawaguchi et al. 1995. A flash-memory based file system. In Proceedings of the USENIX 1995 Technical Conference, New Orleans, Louisiana. 155-164.
Mielke et al., "Recovery Effects in the Distributed Cycling of Flash Memories", IEEE 44th Annual International Reliability Physics Symposium, pp. 29-35, San Jose, USA, Mar. 2006.
Onfi, "Open NAND Flash Interface Specification," revision 1.0, Dec. 28, 2006.
Phison Electronics Corporation, "PS8000 Controller Specification (for SD Card)", revision 1.2, Document No. S-07018, Mar. 28, 2007.
Shalvi, et al., "Signal Codes," Proceedings of the 2003 IEEE Information Theory Workshop (ITW' 2003), Paris, France, Mar. 31-Apr. 4, 2003.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
ST Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.
International Application PCT/IL2007/000579 Patentability report dated Mar. 10, 2009.
International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
International Application PCT/IL2008/001446 "Optimized selection of memory chips in multi-chip memory devices" filed on Nov. 4, 2008.
Perlmutter et al, U.S. Appl. No. 12/332,368 "Efficient Interference Cancellation in Analog Memory Cell Arrays" filed on Dec. 11, 2008.
Kasorla et al, U.S. Appl. No. 12/332,370 "Efficient Data Storage in Multi-Plane Memory Devices" filed on Dec. 11, 2008.
Sommer, N., U.S. Appl. No. 12/364,531 "Parameter Estimation Based on Error Correction Code Parity Check Equations" filed on Feb. 3, 2009.
Golov et al., U.S. Appl. No. 12/344,233 "Wear Level Estimation in Analog Memory Cells" filed on Dec. 25, 2008.
Perlmutter et al., U.S. Appl. No. 12/388,528 "Programming of Analog Memory Cells Using a Single Programming Pulse per State Transition" filed on Feb. 19, 2009.
Perlmutter et al., U.S. Appl. No. 12/390,522 "Programming Analog Memory Cells for Reduced Variance After Retention" filed on Feb. 23, 2009.
Perlmutter et al., U.S. Appl. No. 12/405,275 "Memory Device with Multiple-Accuracy Read Commands" filed on Mar. 17, 2009.
Perlmutter et al., U.S. Appl. No. 12/397,368 "Efficient Readout from Analog Memory Cells Using Data Compression" filed on Mar. 4, 2009.
Sommer, N., U.S. Appl. No. 12/171,797 "Memory Device with Non-Uniform Programming Levels" filed on Jul. 11, 2008.
Shalvi et al., U.S. Appl. No. 12/251,471 "Compensation for Voltage Drifts in Analog Memory Cells" filed on Oct. 15, 2008.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application # 200780026181.3 Official Action dated Apr. 8, 2011.

Huffman, A., "Non-Volatile Memory Host Controller Interface (NVMHCI)", Specification 1.0, Apr. 14, 2008.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.
U.S. Appl. No. 11/957,970 Official Action dated May 20, 2010.
Shalvi et al., U.S. Appl. No. 12/822,207 "Adaptive Over-Provisioning in Memory Systems" filed on Jun. 24, 2010.
Bez et al., "Introduction to Flash Memory," Proceedings of the IEEE, vol. 91, No. 4, Apr. 2003, pp. 489-502.
Eitan et al., "Multilevel Flash Cells and their Trade-Offs," Proceedings of the 1996 IEEE International Electron Devices Meeting (IEDM)5 New York, New York, pp. 169-172.
Goodman and Sayano, "On-Chip ECC for Multi-Level Random Access Memories," Proceedings of the 1989 IEEE/CAM Information Theory Workshop, Jun. 25-29, 1989, Ithaca, New York.
Maayan et al., "A 512Mb NROM Flash Data Storage Memory with 8MB/s Data Rate," Proceedings of the 2002 IEEE International Solid-State Circuits Conference (ISSCC 2002), San Fransisco, California, Feb. 3-7, 2002, pp. 100-101.
Kim and Koh, "Future Memory Technology including Emerging New Memories," Proceddings of the 24 International Conference on Microelectronics (MIEL 2004), Nis, Serbia, and Montenegro, May 16-19, 2004, vol. 1, pp. 377-384.
Jung et al., "A 117-mm2 3.3-V Only 128-Mb Multilevel NANAD Flash Memory for Mass Storage Applications," IEEE Journal of Solid State Circuits, vol. 31, No. 11, Nov. 1996, pp. 1575-1583.
Takeuchi et al., "A Multipage Cell Architecture for High-Speed Programming Multilevel NAND Flash Memories," IEEE Journal of Solid-State Circuits, vol. 33, No. 8, Aug. 1998, pp. 1228-1238.
Lee et al., "Effects of Floating-Gate Interference on NAND Flash Memory Cell Operation," IEEE Electron Device Letters, vol. 23, No. 5, May 2002, pp. 264-266.
U.S. Appl. No. 60/747,106, filed May 12, 2006.
U.S. Appl. No. 60/886,429, filed Jan. 24, 2007.
U.S. Appl. No. 60/868,342, filed Dec. 3, 2006.
U.S. Appl. No. 60/894,456, filed Mar. 13, 2007.
U.S. Appl. No. 60/892,869, filed Mar. 4, 2007.
U.S. Appl. No. 60/886,102, filed Jan. 23, 2007.
U.S. Appl. No. 60/885,024, filed Jan. 16, 2007.
U.S. Appl. No. 60/867,399, filed Nov. 28, 2006.
U.S. Appl. No. 60/863,480, filed Oct. 30, 2006.
U.S. Appl. No. 11/949,135 Official Action dated Oct. 2, 2009.
Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep. 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.
U.S. Appl. No. 12/880,101 "Reuse of Host Hibernation Storage Space by Memory Controller", filed on Sep. 12, 2010.
U.S. Appl. No. 12/890,724 "Error Correction Coding Over Multiple Memory Pages", filed on Sep. 27, 2010.
U.S. Appl. No. 12/171,797 Official Action dated Aug. 25, 2010.
U.S. Appl. No. 12/497,707 Official Action dated Sep. 15, 2010.
U.S. Appl. No. 11/995,801 Official Action dated Oct. 15, 2010.
Numonyx, "M25PE16: 16-Mbit, page-erasable serial flash memory with byte-alterability, 75 MHz SPI bus, standard pinout", Apr. 2008.
Hong et al., "NAND Flash-based Disk Cache Using SLC/MLC Combined Flash Memo", 2010 International Workshop on Storage Network Architecture and Parallel I/Os, pp. 21-30, USA, May 3, 2010.
U.S. Appl. No. 11/945,575 Official Action dated Aug. 24, 2010.
U.S. Appl. No. 12/045,520 Official Action dated Nov. 16, 2010.
U.S. Appl. No. 12/323,544 Office Action dated Dec. 13, 2011.
U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed on Oct. 30, 2011.
U.S. Appl. No. 13/284,913, filed on Oct. 30, 2011.
U.S. Appl. No. 13/338,335, filed on Dec. 28, 2011.
U.S. Appl. No. 13/355,536, filed on Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
US 7,161,836, 01/2007, Wan et al. (withdrawn)

* cited by examiner

COMBINED DISTORTION ESTIMATION AND ERROR CORRECTION CODING FOR MEMORY DEVICES

CROSS-REFERENCE TO RELATED APPLICATIONS

This application is the U.S. National Phase of PCT Application No. PCT/IL2007/000580, which, claims the benefit of U.S. Provisional Patent Application 60/747,106, filed May 12, 2006, U.S. Provisional Patent Application 60/863,480, filed Oct. 30, 2006, U.S. Provisional Application 60/863,810, filed Nov. 1, 2006, U.S. Provisional Patent Application 60/867,399, filed Nov. 28, 2006, U. S. Provisional Patent Application 60/885,024, filed Jan. 16, 2007, U.S. Provisional Patent Application 60/886,102, filed Jan. 23, 2007, U.S. Provisional Patent Application 60/892,869, filed Mar. 4, 2007, U.S. Provisional Patent Application 60/894,290, filed Mar. 12, 2007, and U. S. Provisional Patent Application 60/894,456, filed Mar. 13, 2007, whose disclosures are incorporated herein by reference.

FIELD OF THE INVENTION

The present invention relates generally to memory devices, and particularly to methods and systems for improving memory device performance using error correction coding and distortion estimation.

BACKGROUND OF THE INVENTION

Several types of memory devices, such as Flash memories and Dynamic Random Access Memory (DRAM), use arrays of analog memory cells for storing data. Flash memory devices are described, for example, by Bez et al., in "Introduction to Flash Memory," Proceedings of the IEEE, (91:4), April, 2003, pages 489-502, which is incorporated herein by reference.

In such memory devices, each analog memory cell typically comprises a transistor, which holds a certain amount of electric charge that represents the information stored in the cell. The electric charge written into a particular cell influences the "threshold voltage" of the cell, i.e., the voltage that needs to be applied to the cell so that the cell will conduct current.

Some memory devices, commonly referred to as Single-Level Cell (SLC) devices, store a single bit of information in each memory cell. Typically, the range of possible threshold voltages of the cell is divided into two regions. A voltage value falling in one of the regions represents a "0" bit value, and a voltage belonging to the second region represents "1". Higher-density devices, often referred to as Multi-Level Cell (MLC) devices, store two or more bits per memory cell. In multi-level cells, the range of threshold voltages is divided into more than two regions, with each region representing more than one bit.

Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

Other exemplary types of analog memory cells are Nitride Read-Only Memory (NROM) cells, Ferroelectric RAM (FRAM) cells, magnetic RAM (MRAM) cells and phase change RAM (PRAM, also referred to as Phase Change Memory—PCM) cells. NROM cells are described, for example, by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference.

FRAM, MRAM and PRAM cells are described, for example, by Kim and Koh in "Future Memory Technology including Emerging New Memories," Proceedings of the 24th International Conference on Microelectronics (MIEL), Nis, Serbia and Montenegro, May 16-19, 2004, volume 1, pages 377-384, which is incorporated herein by reference.

In some applications, the data stored in the memory device is encoded using an Error Correcting Code (ECC). For example, Rodney and Sayano describe a number of on-chip coding techniques for the protection of Random Access Memory (RAM) devices, which use multi-level storage cells, in "On-Chip ECC for Multi-Level Random Access Memories," Proceedings of the 1989 IEEE/CAM Information Theory Workshop, June 25-29, 1989, Ithaca, N.Y., which is incorporated herein by reference. As another example, U.S. Pat. No. 6,212,654, whose disclosure is incorporated herein by reference, describes methods for storing data in an analog memory device using coded modulation techniques. Other ECC schemes for multilevel memory devices are described in U.S. Pat. Nos. 6,469,931 and 7,023,735, whose disclosures are incorporated herein by reference.

The threshold voltage values read from analog memory cells are sometimes distorted. The distortion is due to various reasons, such as electrical field coupling from neighboring memory cells, Back Pattern Dependency (BPD) caused by other cells along the same column of the array, disturb noise caused by operations on other cells in the array and threshold voltage drift caused by device aging. Some common distortion mechanisms are described in the article by Bez et al., cited above. Interference in memory cells is also described by Lee et al., in "Effects of Floating Gate Interference on NAND Flash Memory Cell Operation," IEEE Electron Device Letters, (23:5), May, 2002, pages 264-266, which are both incorporated herein by reference.

U.S. Pat. No. 5,867,429, whose disclosure is incorporated herein by reference, describes a method for compensating for electric field coupling between floating gates of a high density Flash Electrically Erasable Programmable Read Only Memory (EEPROM) cell array. According to the disclosed method, a reading of a cell is compensated by first reading the states of all cells that are field-coupled with the cell being read. A number related to either the floating gate voltage or the state of each coupled; cell is then multiplied by the coupling ratio between the cells. The breakpoint levels between states for each of the cells are adjusted by an amount that compensates for the voltage coupled from adjacent cells.

SUMMARY OF THE INVENTION

Embodiments of the present invention provide a method for operating a memory device, including:

encoding data using an Error Correction Code (ECC) and storing the encoded data as first analog values in respective analog memory cells of the memory device;

after storing the encoded data, reading from the memory cells of the memory device in which the encoded data were stored respective second analog values, at least some of which differ from the respective first analog values;

estimating a distortion that is present in the second analog values;

computing error correction metrics with respect to the second analog values responsively to the estimated distortion; and processing the second analog values using the error correction metrics in an ECC decoding process, so as to reconstruct the data.

In some embodiments, computing the error correction metrics includes evaluating, for each memory cell, one or more cell parameters indicative of the distortion, and computing the error correction metrics responsively to the cell parameters. The cell parameters may include at least one parameter selected from a group of parameters consisting of the analog values read from other memory cells, estimated cross-coupling coefficients of the other memory cells, parameters of a statistical distribution of the read second analog values, a number of previous programming and erasure cycles the memory cell has gone through, time durations that elapsed since the previous programming and erasure cycles, previous errors detected in the memory cell, an identity of a word line to which the memory cell is connected, an identity of a bit line to which the memory cell is connected, an estimated parameter of a sense amplifier coupled to the bit line to which the memory cell is connected and an environmental parameter.

In another embodiment, processing the second analog values includes dividing a range of possible values of the second analog values into multiple decision intervals and determining the respective decision intervals in which the second analog values fall, and computing the error correction metrics includes defining a function that modifies the second analog values relative to the decision intervals, so as to improve a performance of the ECC decoding process.

In yet another embodiment, processing the second analog values includes accepting feedback regarding a performance of the ECC decoding process, and modifying the ECC decoding process responsively to the feedback. In still another embodiment, processing the second analog values includes comparing the second analog values to decision thresholds, and modifying the ECC decoding process includes modifying the decision thresholds. Modifying the decision thresholds may include re-reading the second analog values from the memory cells using the modified decision thresholds. In an embodiment, comparing the second analog values to the decision thresholds includes reading the second analog values at the memory device using the decision thresholds, and modifying the decision thresholds includes sending a command to the memory device requesting to modify the thresholds.

In a disclosed embodiment, processing the second analog values includes producing multiple estimates of the data stored in each memory cell by performing respective multiple iterations of the ECC decoding process using different sets of the decision thresholds, and reconstructing the data responsively to the multiple estimates of the data. Reconstructing the data may include selecting one of the multiple estimates independently for each memory cell.

In some embodiments, processing the second analog values includes applying a first ECC decoding process having a first error performance, accepting the feedback includes accepting an indication of decoding errors in the data decoded using the first process, and modifying the ECC decoding process includes processing the second analog values using a second ECC decoding process having a second error performance better than the first error performance. In another embodiment, modifying the ECC decoding process includes modifying a sampling resolution used in reading the second analog values.

In some embodiments, reading the second analog values includes reading multiple instances of the second analog values using respective different sets of decision thresholds, and computing the error correcting metrics includes combining the multiple instances independently for each memory cell and computing the error correcting metrics based on the combined multiple instances. Reading and combining the multiple instances of the second analog values may include iteratively obtaining additional instances of the second analog values and updating the error correcting metrics using the additional instances until successfully decoding the ECC.

In some embodiments, for each memory cell, estimating the distortion includes reading the second analog values from a subset of potentially-interfering memory cells that potentially contribute to the distortion in the second analog value read from the memory cell, and computing the error correction metrics includes evaluating the distortion contributed by the potentially-interfering memory cells. In an embodiment, evaluating the distortion contributed by the potentially-interfering memory cells to the memory cell includes approximating the distortion contributed by each potentially-interfering memory cell based on both the second analog value read from the potentially-interfering memory cell and on the second analog value read from the memory cell. In another embodiment, processing the second analog values includes processing the second analog value of the memory cell at a first quantization level, and processing the second analog values read from the potentially-interfering memory cells at a second quantization level that is coarser than the first quantization level. Processing the second analog values may include reading the second analog values at the first and second quantization levels by iteratively modifying a threshold of a circuit used for reading the second analog values.

In a disclosed embodiment, storing the encoded data includes writing the first analog values into the memory cells using a Program and Verify (P&V) process, and estimating the distortion includes classifying the potentially-interfering memory cells into at least two classes selected from a group of classes consisting of memory cells that were fully programmed earlier than the memory cell, memory cells that were fully programmed later than the memory cell and memory cells that were that were fully programmed concurrently with the memory cell by the P&V process, and calculating the aggregate distortion separately within each of the classes.

In some embodiments, the memory cells may include Flash memory cells, Dynamic Random Access Memory (DRAM) cells, Phase Change Memory (PCM) cells, Nitride Read-Only Memory (NROM) cells, Magnetic Random Access Memory (MRAM) cells or Ferroelectric Random Access Memory (FRAM) cells.

In a disclosed embodiment, the ECC includes a block code. The block code may include one of a Bose-Chaudhuri-Hochquenghem (BCH) code and a Reed-Solomon (RS) code. In an embodiment, the block code may include one of a Low-Density Parity Check (LDPC) code, a turbo-code and a Turbo Product Code (TPC). The ECC decoding process may include an iterative decoding process. Additionally or alternatively, the ECC decoding process may use feedback produced by reading the second analog values. The ECC decoding process may include a Maximum Likelihood Sequence Estimation (MLSE) process. The ECC may include one of a convolutional code, a Trellis-Coded Modulation (TCM) code, a Bit Interleaved Coded Modulation (BICM) code and a concatenated code. The error correction metrics may include Likelihood Ratios (LRs) or Log Likelihood Ratios (LLRs).

In some embodiments, estimating the distortion includes predicting the distortion present in one of the memory cells based on the distortion present in other memory cells.

In an embodiment, the memory cells are arranged in isolated groups of potentially-interfering cells, estimating the distortion in each group includes evaluating an inverse of a cross-coupling matrix representing mutual interference between pairs of the memory cells in the group, and computing the error correction metrics includes computing a distance between the inverse of the cross-coupling matrix applied to the first analog values, summed with average distortion levels in the respective memory cells in the group, and the inverse of the cross-coupling matrix applied to the second analog values. In another embodiment, the isolated groups include respective Nitride Read-Only Memory (NROM) cells, and the potentially-interfering cells in each group include first and second charge storage areas of the respective NROM cell. In yet another embodiment, the memory cells are arranged in isolated groups of potentially-interfering cells, estimating the distortion in each group includes evaluating a vector of average distortion levels in the respective memory cells in the group and a cross-coupling matrix representing mutual interference between pairs of the memory cells in the group, and computing the error correction metrics includes computing the metrics responsively to a difference between a vector of the second analog values read from the memory cells in the group and a product of the cross-coupling matrix and the vector of the average distortion levels. In another embodiment, the isolated groups include respective Nitride Read-Only Memory (NROM) cells, and the potentially-interfering cells in each group include first and second charge storage areas of the respective NROM cell.

In yet another embodiment, storing the encoded data includes scrambling the encoded data and storing the scrambled data, and processing the second analog values includes descrambling the second analog values read from the memory cells. In still another embodiment, storing the data includes maintaining at least some of the memory cells at an erased level, and reading the second analog values, estimating the distortion, computing the error correcting metrics and processing the second analog values include compensating for the distortion in the second analog values read from the memory cells that were maintained at the erased level.

There is also provided, in accordance with an embodiment of the present invention, a method for operating a memory device, including:

storing data as first analog values in respective analog memory cells of the memory device;

after storing the data, reading multiple instances of second analog values from the respective memory cells, each of the instances read by comparing the second analog values to a respective decision threshold;

estimating a distortion that is present in the second analog values; and processing the multiple instances of the second analog values responsively to the estimated distortion, so as to reconstruct the data.

In some embodiments, reading and processing the multiple instances include iteratively obtaining additional instances of the second analog values.

There is additionally provided, in accordance with an embodiment of the present invention, apparatus for retrieving data that has been encoded using an Error Correction Code (ECC) and stored as first analog values in respective analog memory cells of a memory device, the apparatus including:

a reading unit, which is arranged to read from the analog memory cells of the memory device in which the encoded data were stored respective second analog values, at least some of which differ from the respective first analog values;

a signal processing unit, which is arranged to estimate a distortion that is present in the second analog values and to compute error correction metrics with respect to the second analog values responsively to the estimated distortion; and a decoder, which is arranged to process the second analog values using the error correction metrics, so as to decode the ECC and reconstruct the data.

In an embodiment, the reading unit resides in a first Integrated Circuit (IC) and the signal processing unit and the decoder reside in a second IC different from the first IC. In an alternative embodiment, the reading unit, the signal processing unit and the decoder are integrated in a single device.

There is further provided, in accordance with an embodiment of the present invention, apparatus for retrieving data that has been stored as first analog values in respective analog memory cells of a memory device, the apparatus including:

a reading unit, which is arranged to read multiple instances of second analog values from the respective memory cells, each of the instances read by comparing the second analog values to a respective decision threshold; and a signal processing unit, which is arranged to estimate a distortion that is present in the second analog values and to process the multiple instances of the second analog values responsively to the estimated distortion, so as to reconstruct the data.

The present invention will be more fully understood from the following detailed description of the embodiments thereof, taken together with the drawings in which:

DETAILED DESCRIPTION OF EMBODIMENTS

Overview

Figure 1:
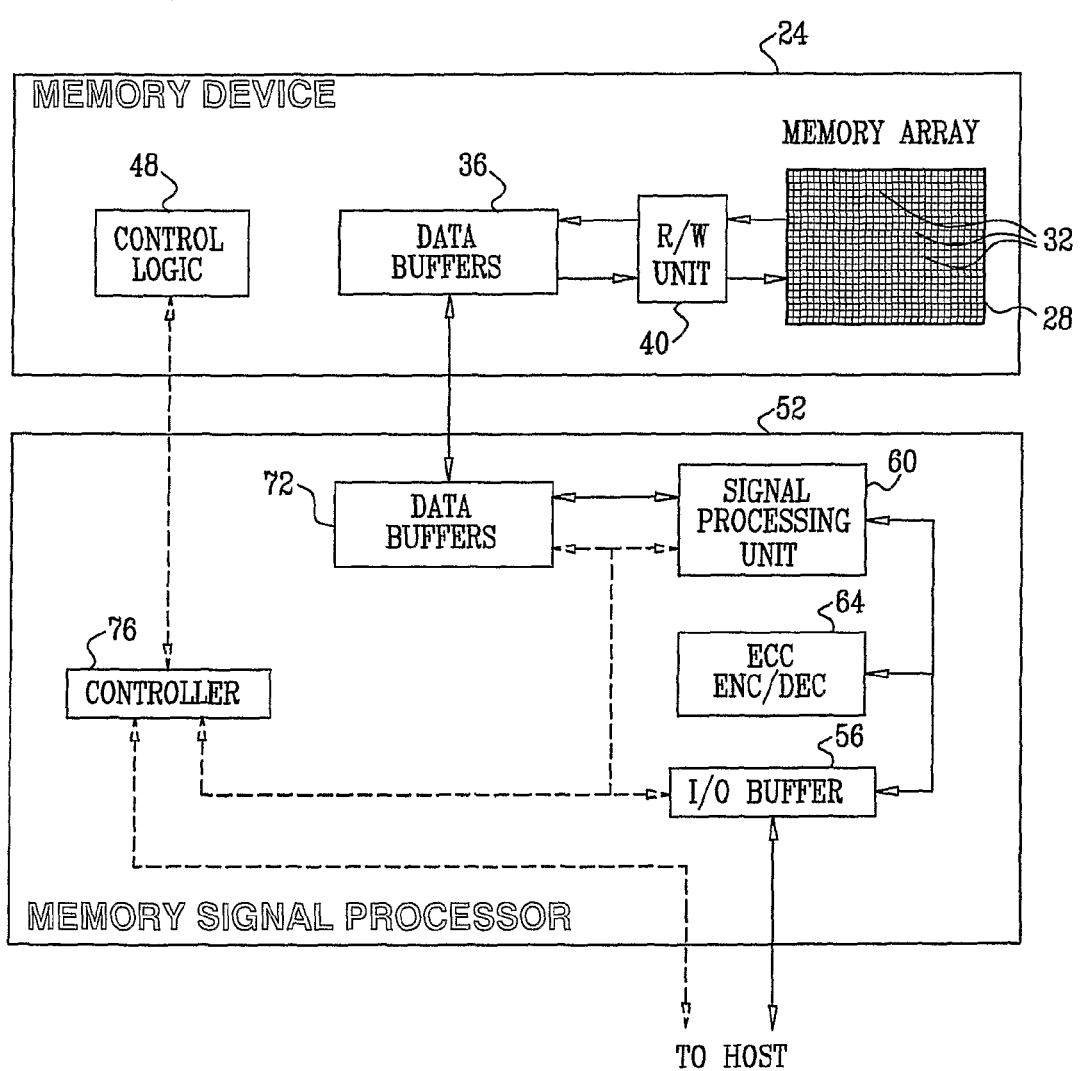
FIG. 1 is a block diagram that schematically illustrates a system for memory signal processing, in accordance with an embodiment of the present invention.

Embodiments of the present invention provide improved methods and systems for retrieving information stored in memory devices. In the embodiments that are described hereinbelow, data is stored as levels of electric charge that are written into an array of analog memory cells. The charge levels determine the respective threshold voltages of the cells. In order to reduce the effects of the various distortion mechanisms, the data is encoded using an Error Correcting Code (ECC) prior to its storage in the memory cells.

The data is reconstructed by reading the threshold voltages of the memory cells and decoding the ECC using an ECC decoder. The ECC decoder operates on ECC metrics, such as Log-Likelihood Ratios (LLRs), which are defined over the read voltages.

A signal processing unit estimates the distortion that is present in the read voltages. The distortion may be contributed by other cells in the array, by operations performed on such cells and/or by effects such as aging. Depending on the distortion mechanism, the actual level of electrical charge stored in the cells and/or the sensed and sampled voltages may be affected. The signal processing unit calculates the ECC metrics based on the estimated distortion, and provides the ECC metrics to the ECC decoder. The ECC decoder decodes the ECC using the metrics, so as to reconstruct the data stored in the target memory cells. The ECC metrics may also take into account additional certain cell parameters that are indicative of the anticipated distortion level. In some embodiments, feedback as to the success, failure or quality of the ECC decoding process is used to modify the operation of the decoding process.

Using ECC metrics that are based on the estimated distortion considerably improves the performance of the ECC decoding process. The improved performance of the ECC decoding process can be used to achieve higher information storage density in several ways. For example, the number of voltage levels (and thus the number of information bits) stored in each memory cell can be increased. In other embodiments, smaller and denser memory cell arrays, which may have increased cross-coupling between cells and/or a higher aging rate, can be used with good performance because of the improved ECC performance. Additionally or alternatively, the code rate being used can be decreased for a given error rate requirement, resulting in less coding overhead. In alternative embodiments, the error performance of a given memory array and ECC can be improved. The improved performance can also be used to reduce the range of threshold voltages used by the memory device, thus reducing the power consumption of the device and improving its reliability and endurance.

The methods and systems described herein can be used in a wide variety of memory devices and cell types, such as different Flash memory cells, DRAM cells, NROM cells, MRAM cells and PCM cells. The principles of the present invention can also be used for data storage and retrieval in various storage media and devices, such as in Hard Disk Drives (HDD).

Any suitable estimation method can be used for estimating the distortion in the voltages read from the memory cell array. Several exemplary methods are described herein.

System Description

FIG. 1 is a block diagram that schematically illustrates a system 20 for memory signal processing, in accordance with an embodiment of the present invention. System 20 comprises a memory device 24, which stores data in a memory cell array 28. The memory array comprises multiple analog memory cells 32. In the context of the present patent application and in the claims, the term "analog memory cell" is used to describe any memory cell that stores information by holding a continuous, analog value of a physical parameter, such as an electrical voltage or charge. Array 28 may comprise analog memory cells of any kind, such as, for example, NAND and NOR Flash cells, PCM, NROM, FRAM, MRAM and DRAM cells.

Data for storage in memory device 24 is provided to the device and cached in data buffers 36. The data is then converted to analog voltages and written into memory cells 32 using a reading/writing (R/W) unit 40, whose functionality is described in greater detail below. When reading data out of array 28, unit 40 converts the electric charge, and thus the analog voltages of memory cells 32, into digital samples. Each digital sample is represented using one or more bits. The samples are cached in buffers 36. The samples produced by unit 40 are also referred to as soft samples. The operation and timing of memory device 24 is managed by control logic 48.

The storage and retrieval of data in and out of memory device 24 is performed by a Memory Signal Processor (MSP) 52. MSP 52 intermediates between memory device 24 and the host or application that stores and retrieves the data. As will be shown in detail hereinbelow, MSP 52 uses novel methods that combine error correction coding and distortion estimation in order to improve the reliability and storage density of the data.

MSP 52 comprises an encoder/decoder 64, which encodes the data to be written to device 24 using an ECC, and decodes the ECC when reading data out of device 24. A signal processing unit 60 processes the data that is written into and retrieved from device 24. In particular, unit 60 estimates the distortion that affects the voltages read out of cells 32. The estimated distortion is used to improve the performance of the ECC, as will be described in detail further below.

MSP 52 comprises a data buffer 72, which is used by unit 60 for storing data and for interfacing with memory device 24. MSP 52 also comprises an Input/Output (I/O) buffer 56, which forms an interface between the MSP and the host. A controller 76 manages the operation and timing of MSP 52. In addition to carrying out the functions described hereinbelow, controller 76 may perform additional memory management functions such as wear leveling and bad block management. Signal processing unit 60 and controller 76 may be implemented in hardware. Alternatively, unit 60 and/or controller 76 may comprise microprocessors that run suitable software, or a combination of hardware and software elements.

The configuration of FIG. 1 is an exemplary system configuration, which is shown purely for the sake of conceptual clarity. Any other suitable configuration can also be used. Elements that are not necessary for understanding the principles of the present invention, such as various interfaces, addressing circuits, timing and sequencing circuits, data scrambling circuits and debugging circuits, have been omitted from the figure for clarity.

In the exemplary system configuration shown in FIG. 1, memory device 24 and MSP 52 are implemented as two separate Integrated Circuits (ICs). In alternative embodiments, however, the memory device and MSP may be integrated in a single IC or System on Chip (SoC). In some implementations, a single MSP 52 may be connected to multiple memory devices 24. Additional architectural aspects of certain embodiments of implementation of system 20 are described in greater detail in U.S. Provisional Patent Application 60/867,399, cited above.

In a typical writing operation, data to be written into memory device 24 is accepted from the host and cached in I/O buffer 56. Encoder/decoder 64 encodes the data, and the encoded data is transferred, via data buffers 72, to memory device 24. In device 24 the data is temporarily stored in buffers 36. R/W unit 40 converts the data to analog voltage values and writes the data into the appropriate cells 32 of array 28.

In a typical reading operation, R/W unit 40 reads analog voltage values out of the appropriate memory cells 32 and converts the voltages to digital samples. The samples are cached in buffers 36 and transferred to buffers 72 of MSP 52.

Signal processing unit 60 estimates the distortion that is present in the data samples, using methods that are described hereinbelow.

Blocks of data are transferred from buffers 72 to unit 60, and encoder/decoder 64 decodes the ECC of these blocks. Encoder/decoder 64 uses the distortion estimation provided by unit 60 to improve the performance of the ECC decoding process. The decoded data is transferred via I/O buffer 56 to the host.

In some embodiments, MSP 52 scrambles the data before it is written into the memory cells, and de-scrambles the data read from the memory cells, in order to improve the distortion estimation performance.

Memory Array Structure and Distortion Mechanisms

Figure 2:
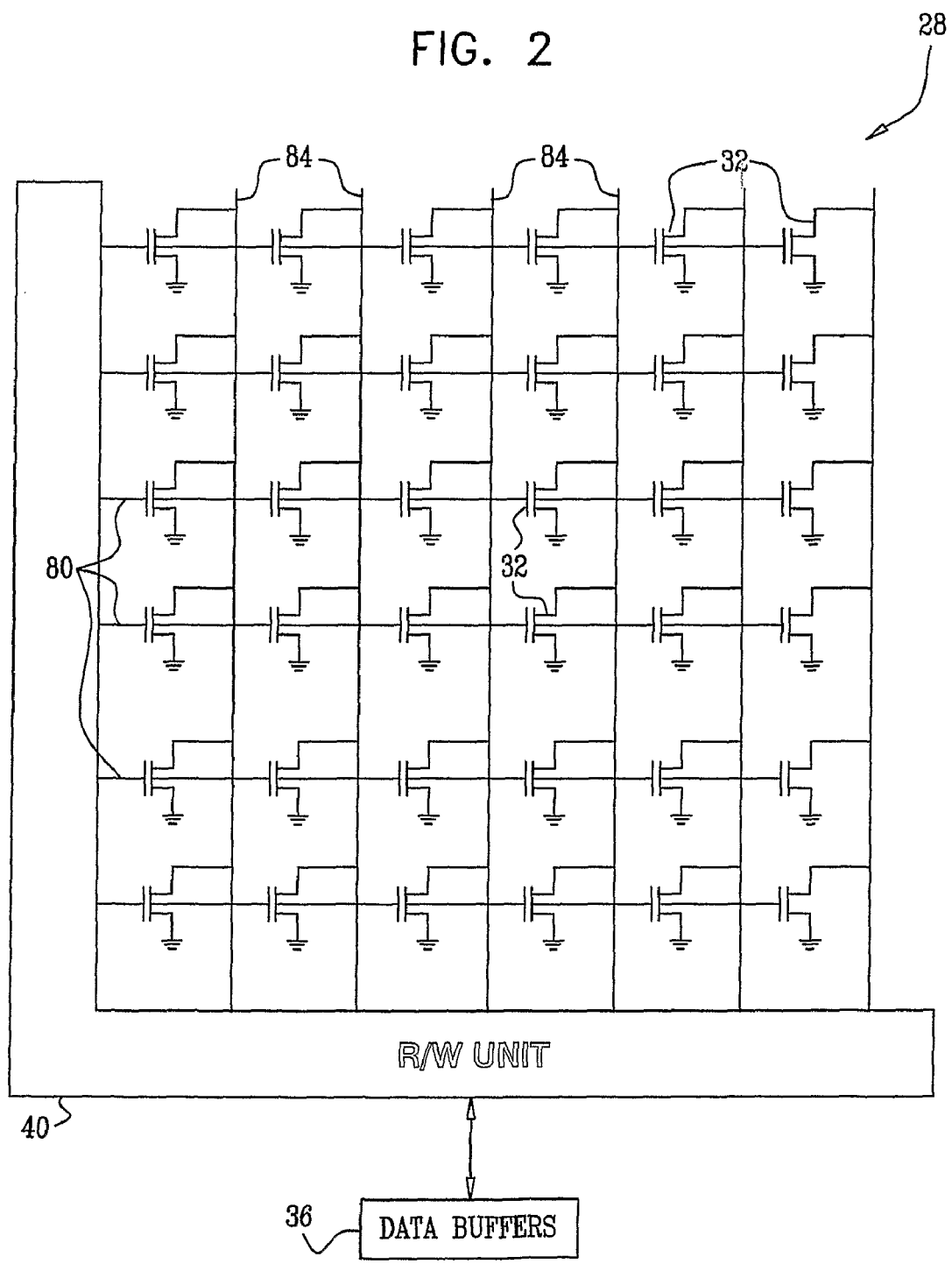
FIG. 2 is a diagram that schematically illustrates a memory cell array, in accordance with an embodiment of the present invention.

FIG. 2 is a diagram that schematically illustrates memory cell array 28, in accordance with an embodiment of the present invention. Although FIG. 2 refers to Flash memory cells that are connected in a particular array configuration, the principles of the present invention are applicable to other types of memory cells and other array configurations, as well. Some exemplary cell types and array configurations are described in the references cited in the Background section above.

Memory cells 32 of array 28 are arranged in a grid having multiple rows and columns. Each cell 32 comprises a floating gate Metal-Oxide Semiconductor (MOS) transistor. A certain amount of electrical charge (electrons or holes) can be stored in a particular cell by applying appropriate voltage levels to the transistor gate, source and drain. The value stored in the cell can be read by measuring the threshold voltage of the cell, which is defined as the minimal voltage that needs to be applied to the gate of the transistor in order to cause the transistor to conduct. The read threshold voltage is proportional to the charge stored in the cell.

In the exemplary configuration of FIG. 2, the gates of the transistors in each row are connected by word lines 80. The sources of the transistors in each column are connected by bit lines 84. In some embodiments, such as in some NOR cell devices, the sources are connected to the bit lines directly. In alternative embodiments, such as in some NAND cell devices, the bit lines are connected to strings of floating-gate cells.

Typically, R/W unit 40 reads the threshold voltage of a particular cell 32 by applying varying voltage levels to its gate (i.e., to the word line to which the cell is connected) and checking whether the drain current of the cell exceeds a certain threshold (i.e., whether the transistor conducts). Unit 40 usually applies a sequence of different voltage values to the word line to which the cell is connected, and determines the lowest gate voltage value for which the drain current exceeds the threshold. Typically, unit 40 reads an entire row of cells, also referred to as a page, simultaneously.

In some embodiments, unit 40 measures the drain current by pre-charging the bit line of the cell to a certain voltage level. Once the gate voltage is set to the desired value, the drain current causes the bit line voltage to discharge through the cell. Unit 40 measures the bit line voltage several microseconds after the gate voltage is applied, and compares the bit line voltage to the threshold. In some embodiments, each bit line 84 is connected to a respective sense amplifier, which amplifies the bit line current and converts it to voltage. The amplified voltage is compared to the threshold using a comparator.

Some of the methods described hereinbelow involve adjustment of the thresholds to which the read voltage levels are compared. Such threshold adjustments may be performed at a high rate, in some cases prior to each reading operation. In some embodiments, memory device 24, and in particular R/W unit 40, is designed to enable fast, efficient and flexible threshold adjustments. For example, the interface between MSP 52 and memory device 24 may comprise commands that enable fast and efficient threshold adjustments by R/W unit 40. Such commands may specify the requested adjustment per each individual threshold, or request a uniform adjustment of an entire threshold set. Exemplary command interfaces that can be used for this purpose are described in U.S. Provisional Patent Applications 60/889,277, 60/912,056 and 60/913,281, cited above.

The voltage reading method described above is an exemplary method. Alternatively, R/W unit 40 may use any other suitable method for reading the threshold voltages of cells 32. For example, unit 40 may comprise one or more Analog to Digital Converters (ADCs), which convert the bit line voltages to digital samples. Further alternatively, the methods and systems described herein can be used with any suitable method or means for writing and reading analog values to and from the analog memory cells.

In some embodiments, entire pages (rows) are written and read in parallel. Erasing of cells is usually carried out in blocks that contain multiple pages. Typical memory devices may comprise several hundreds of thousands of pages, each comprising several thousand cells (e.g., 16K or 32K cells). A typical erasure block is on the order of 128 pages, although other block sizes can also be used.

The voltages digitized by R/W unit 40 may contain various types of distortion, which are caused by different distortion mechanisms in array 28. Some distortion mechanisms affect the actual electrical charge that is stored in the cells, while other mechanisms distort the sensed voltages. For example, electrical coupling between adjacent cells in the array may modify the threshold voltage in a particular cell. This effect is referred to as interference noise. As another example, electrical charge may leak from the cells over time. As a result of this aging effect, the threshold voltage of the cells may drift over time from the initially-written value.

Another type of distortion, commonly referred to as disturb noise, is caused by a read, write or erase operation on a certain cell in the array, which causes unintended programming or erasure of other cells. As yet another example, the source-drain current of a particular cell can be affected by the charge in adjacent cells, e.g., other cells in the same NAND cell string, via an effect referred to as back pattern dependency.

Figure 3:
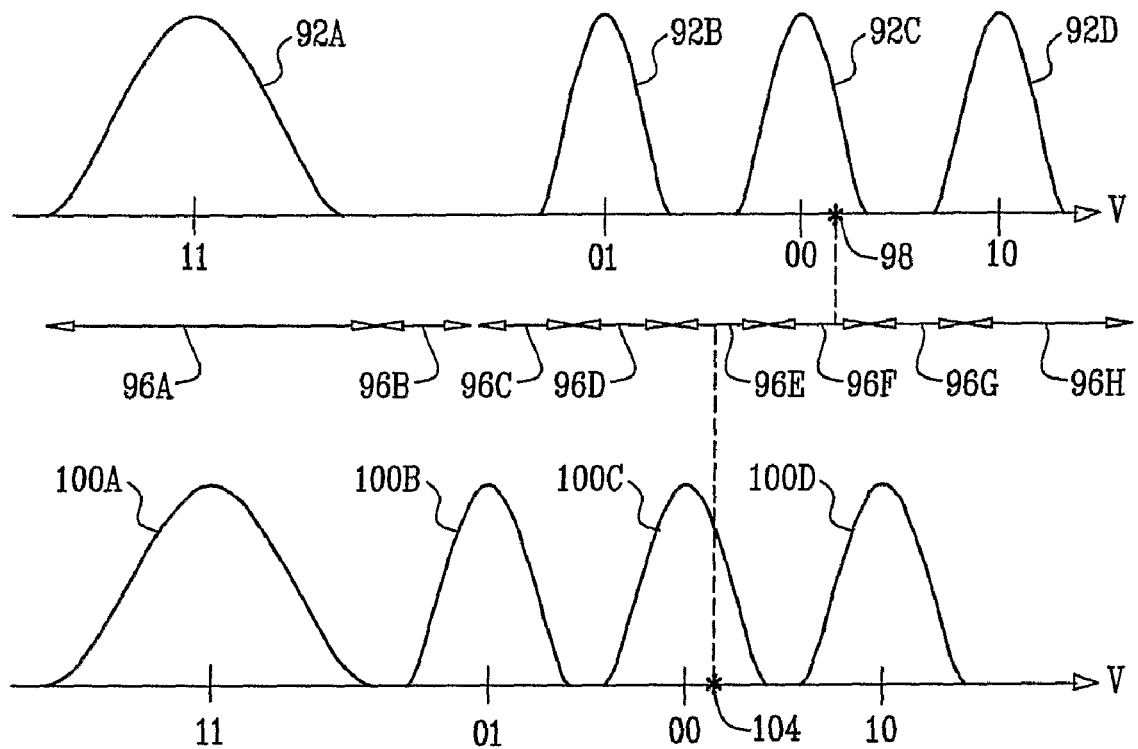
FIG. 3 is a graph showing voltage distributions in a memory cell array, in accordance with an embodiment of the present invention.

FIG. 3 is a graph showing voltage distributions in memory cell array 28, in accordance with an embodiment of the present invention. FIG. 3 is used to demonstrate the effect of distortion on the accuracy of reading values from the memory cell array. In the example of FIG. 3, each cell 32 stores two bits of information using four nominal voltage levels. Plots 92A . . . 92D show the voltage distribution over the entire array, at the time each cell is programmed. Plot 92A shows the distribution of voltages in the cells that store "11" bit values. Plots 92B, 92C and 92D show the voltage distribution in the cells that store "01", "00" and "10." bit values, respectively.

In the present example, the threshold voltages of cells 32 are read using 3-bit conversion. Thus, the range of threshold voltages is divided into eight decision zones 96A . . . 96H. The data content of each cell is determined based on the decision zone in which the threshold level read from the cell falls. For example, a voltage level 98 read from a particular cell, which falls in decision zone 96F, indicates that the data content of the cell is "00". Note that voltage levels that fall in decision zone 96E are also interpreted as indicating a data content of "11". Although four decision zones are generally sufficient for decoding the four possible bit combinations, using eight decision zones provides better resolution and improves the distortion estimation and decoding performance.

As a result of the various distortion mechanisms, the distribution of threshold voltages may change. For example, the threshold voltages may drift over time due to aging. Plots 100A . . . 100D respectively show the distributions of cells having "11", "01", "00" and "10" data content, after the voltages shifted over time.

In particular, voltage level 98 has changed to a shifted level 104 due to distortion. As can be seen in the figure, voltage level 104 falls in decision zone 96E, and not in zone 96F as originally intended. In the present example, due to the increased resolution provided by the eight decision zones, the deviation will not necessarily cause a decision error. However, in general, it can be seen that distortion may cause an erroneous reading of the data content of the cell.

ECC Decoding Assisted by Distortion Estimation

System 20 reduces the probability of making erroneous decisions as to the data content of cells 32 by encoding the data stored in the cells using an ECC. In the present example, encoder/decoder 64 encodes the data in each page separately. In alternative embodiments, the data can be encoded in blocks having any other suitable size. For example, each page can be divided into several sectors, and encoder/decoder 64 encodes the data in each sector separately. Alternatively, the data can be encoded over multiple pages.

Various types of error correcting codes known in the art can be used to encode the data. The ECC may comprise, for example, a block code that separately encodes fixed-size blocks of data. Exemplary block codes may comprise the Bose-Chaudhuri-Hochquenghem (BCH) code or the Reed-Solomon (RS) code. A particular class of block codes is a class of codes that lend themselves to iterative decoding processes. Codes that are typically decoded using iterative processes comprise, for example, Low-Density Parity Check (LDPC) codes, turbo-codes and Turbo Product Codes (TPC). Other types of codes may comprise convolutional codes and Trellis-Coded Modulation (TCM) codes. Further alternatively, the code may comprise a known Bit Interleaved Coded Modulation (BICM) code, which typically comprises a convolutional code, a bit interleaver and a Gray mapper.

The ECC process may alternatively comprise a feedback-coded programming process, such as the process described in U.S. Provisional application 60/863,810, cited above. In some cases, two codes can be used sequentially as an inner and outer code, to form a concatenated code.

The ECC used by encoder/decoder 64 operates on metrics, which are defined over the read data. The ECC metrics may provide information regarding the statistical likelihood that a particular information bit (or symbol, as in the case of Reed-Solomon codes and trellis codes) was encoded, given that a certain voltage level was read. The ECC metrics may be based on parameters such as the centers and the variance of the voltage distributions 92A . . . 92D.

Typically, MSP 52 estimates parameters of the voltage distributions and uses the estimated parameters to calculate the bit or symbol likelihoods. In addition, the MSP may maintain or receive information regarding the conditions of the cells, and use this information to assess the characteristics of the voltage distributions in the cells and modify the ECC metrics accordingly. For example, the MSP may track the number of program and erase cycles the cells have gone through and how long ago they have been programmed. These parameters are indicative of the level of leakage noise from which the cells have suffered since they were programmed.

In some embodiments, the ECC metrics may comprise Likelihood Ratios (LRs) or Log-Likelihood Ratios (LLRs), which are defined as $$LR = \frac{p(X_i = 1 \mid r)}{p(X_i = 0 \mid r)} \qquad [1]$$

$$LLR \equiv \Lambda(X_i) = \log\left[\frac{p(X_i = 1 \mid r)}{p(X_i = 0 \mid r)}\right] \qquad [2]$$

wherein $X_i$ denotes a particular data bit out of the one or more bits stored in a particular memory cell and r denotes the voltage level read from the cell. Alternatively, the ECC metrics may comprise any other metric defined over the voltage levels read from the memory cells, which assists the ECC decoding process.

Other types of ECC metrics may comprise square error LLRs as often used in Additive White Gaussian Noise scenarios and mean square error estimates as often used in Viterbi decoders, TCM and BICM codes.

In some embodiments, the ECC metric may indicate the relative reliabilities of the decoded bits. For example, the bit can be classified into "suspected as erred," "regular" or "safe" based on the distance of the read threshold level from the center of the distribution. When the read voltage is close to the edge of a decision zone, the corresponding bits are classified as "suspected as erred." When the voltage is well within the decision zone the corresponding bits are classified as "safe." Otherwise, the bits are classified as "regular." Such ECC metrics can be used, for example, by block code soft decoders.

Signal processing unit 60 estimates the distortion that is present in the voltages read from memory cells 32, and calculates the ECC metrics based on the estimated distortion. Using ECC metrics that are based on the estimated distortion considerably improves the performance of the ECC decoding process carried out by encoder/decoder 64, since they give more weight to values having less distortion, and vice versa.

Referring to the example of FIG. 3, and assuming $p(X_i=0)=p(X_i=1)=0.5$, Equation [2] can be written as $$\Lambda(X_i) = \log\left[\frac{p(X_i = 1 \mid r)}{p(X_i = 0 \mid r)}\right] = \log\left[\frac{\sum_{S \mid X_i=1} p(r \mid S)}{\sum_{S \mid X_i=0} p(r \mid S)}\right] \qquad [3]$$

wherein S denotes decision zones 96A . . . 96H, $S|X_i=0$ denotes the subset of the values that are programmed into the cells in which the bit $X_i$ equals "0", and $S|X_i=1$ denotes the subset of programmed values in which bit $X_i$ equals "1".

Let $T_0$ denote the value for which $X_i=0$ that is closest to the read voltage r, and $T_1$ denote the value for which $X_i=1$ that is closest to the read voltage r. In most practical cases, the sums in Equation [3] can be approximated by the maximal terms in each sum, which are typically the terms that involve $T_0$ and $T_1$. Assuming also that the voltage distribution of r is Gaussian with variance $\sigma^2$, Equation [3] can be approximated by $$\Lambda(X_i) \approx \frac{1}{2\sigma^2}[(r-T_0)^2 - (r-T_1)^2] \qquad [4]$$

Since r represents a value within a specific decision zone, which is denoted $[V_a,V_b]$, Equation [4] can be written more accurately as $$\Lambda(X_i) \approx \log\left[Q\left\{\frac{V_a-T_1}{\sigma}\right\} - Q\left\{\frac{V_b-T_1}{\sigma}\right\}\right] - \log\left[Q\left\{\frac{V_a-T_0}{\sigma}\right\} - Q\left\{\frac{V_b-T_0}{\sigma}\right\}\right] \qquad [5]$$

wherein Q( ) denotes the Gaussian complementary Cumulative Distribution Function (CDF). In the present example, unit 60 calculates the LLR values based on the values of $V_a$, $V_b$, $T_0$, $T_1$ and $\sigma$.

In some embodiments, the ECC metrics evaluated by MSP may take into account additional cell parameters available to the MSP, in order to improve the accuracy and performance of the ECC metrics. Such additional information may comprise any parameter that is indicative of the anticipated distortion level of the cell, such as the values written into neighboring cells, estimated cross-coupling coefficients of neighboring cells, the number of program and erasure cycles the cell has gone through, the time durations that elapsed since the previous program and erasure cycles, previous decoding errors detected in the cell, the identity of the word line and/or bit line to which the cell is connected, environmental parameters such as supply voltage (Vcc) and temperature, and/or any other suitable parameters. For example, the conditional probabilities in Equation [3] above can be replaced with conditional probabilities that take the additional cell parameters into account.

In some practical cases, the level of cross-coupling interference from a neighboring cell depends not only on the voltage (or charge) stored in the neighboring cell, but also on the voltage level (or charge level) of the interfered cell. Thus, in some embodiments, the MSP calculates the ECC metrics by evaluating a function defined over the voltage (or charge) levels of the interfering cells and of the interfered cell.

Some aspects of estimating the values of the cross-coupling coefficients are described in a PCT application entitled "Distortion Estimation and Cancellation in Memory Devices," filed May 10, 2007, whose disclosure is incorporated herein by reference.

In some cases, the memory cell array can be partitioned into groups of cells, such that the cross-coupling interference is confined to each group, and different groups are isolated from one another. An extreme example occurs in NROM devices, in which each cell stores two values in two charge areas of the cell. When cell-to-cell isolation is sufficiently high, cross-coupling can be assumed to occur only between the two values of each cell.

In such cases, the cross-coupling coefficients among the cells in a particular cell group can be arranged in a cross-coupling matrix, and the ECC metrics can be calculated using the cross-coupling matrix.

$$\text{Let } \underline{x} = \begin{bmatrix} x_1 \\ x_2 \\ \vdots \\ x_k \end{bmatrix}$$

denote the k values written into a group of k mutually-interfering cells.

$$\text{Let } \underline{y} = \begin{bmatrix} y_1 \\ y_2 \\ \vdots \\ y_k \end{bmatrix}$$

denote the k values read from the cells. In some cases, such as when the cells are written using a Program and Verify (P&V) process that is applied simultaneously to all the cells in the group, $\underline{x} \approx \underline{y}$ at the time the cells are programmed. Vector $\underline{y}$ changes over time due to the different distortion mechanisms, such as aging. The value of vector $\underline{y}$ at a later point in time can be written as $$\underline{y} = \underline{x} + H(\underline{m} + \underline{n}) \qquad [6]$$

wherein $\underline{m}$ denotes a vector of respective voltage shifts of the k voltages due to aging, and $\underline{n}$ denotes a vector of random aging noise components. The k random components are assumed to have a Gaussian distribution with variance $\sigma^2$. H is the cross-coupling matrix defined as $$H = \begin{bmatrix} 1 & \alpha_{12} & \cdots & \alpha_{1k} \\ \alpha_{21} & 1 & \cdots & \alpha_{2k} \\ \vdots & \vdots & \ddots & \vdots \\ \alpha_{k1} & \alpha_{k2} & \cdots & 1 \end{bmatrix} \qquad [7]$$

wherein $\alpha_{ij}$ denotes the cross-coupling coefficient from cell j to cell i in the group. For k=2, such as for NROM cells, $$H = \begin{bmatrix} 1 & \alpha_{12} \\ \alpha_{21} & 1 \end{bmatrix}.$$

The term $H\underline{n}$ in Equation [6] above is not white, since its k components are correlated. Multiplying both sides of Equation [6] above by the inverse of H yields $$H^{-1}\underline{y} = (H^{-1}\underline{x} + \underline{m}) + \underline{n} \qquad [8]$$

wherein the term $(H^{-1}\underline{x} + \underline{m})$ is deterministic (and known, assuming the written levels are known) and $\underline{n}$ is random and white.

MSP 52 calculates $H^{-1}$ by estimating coefficients $\alpha_{ij}$. The MSP can then decode the data by determining the values of $\underline{x}$ that minimize the expression $$\|H^{-1}\underline{y} - (H^{-1}\underline{x} + \underline{m})\|^2 \qquad [9]$$

wherein $\|\ \|$ denotes the Euclidean norm.

For example, when using a hard-decision ECC decoder, the MSP can scan or search through the different possible data value combinations of $\bar{x}$, in order to determine the set of values that minimizes Expression [9] above. Any suitable search process can be used for this purpose. For example, the MSP can use sphere decoding methods, such as the methods described by Agrell et al., in "Closest Point Search in Lattices," IEEE Transactions on Information Theory, volume 48, August 2002, pages 2201-2214, which is incorporated herein by reference. Alternatively, V-BLAST approximate decoding methods, as are known in the art, can also be used.

When a soft-decision ECC decoder is used, such as when using BICM, the MSP typically calculates the LLR of each data bit during the search process. For example, the MSP can calculate the minimum value of Expression [9] above for all $\bar{x}$ values in which the data bit in question is set to "1", and subtract from this result the minimum value of Expression [9] for all $\bar{x}$ values in which the data bit in question is set to "0". The resulting LLR values can then be used as metrics by the soft ECC decoder. Alternatively, $\bar{m}$ can be approximated by using the nominal mean values of the shifts, based on hard decisions on $\bar{y}$. Then, the expression $\bar{y} - H \cdot \bar{m}$ can be used as input to the LLR calculations in Equations [4] or [5] above.

Generally, Expression [9] above can be used as an ECC metric by the ECC decoder. For example, when the ECC comprises a TCM scheme and the ECC decoder comprises a Viterbi decoder, the decoder can use Expression [9] above as a metric for the group of values corresponding to the k cells in the group.

Figure 4:
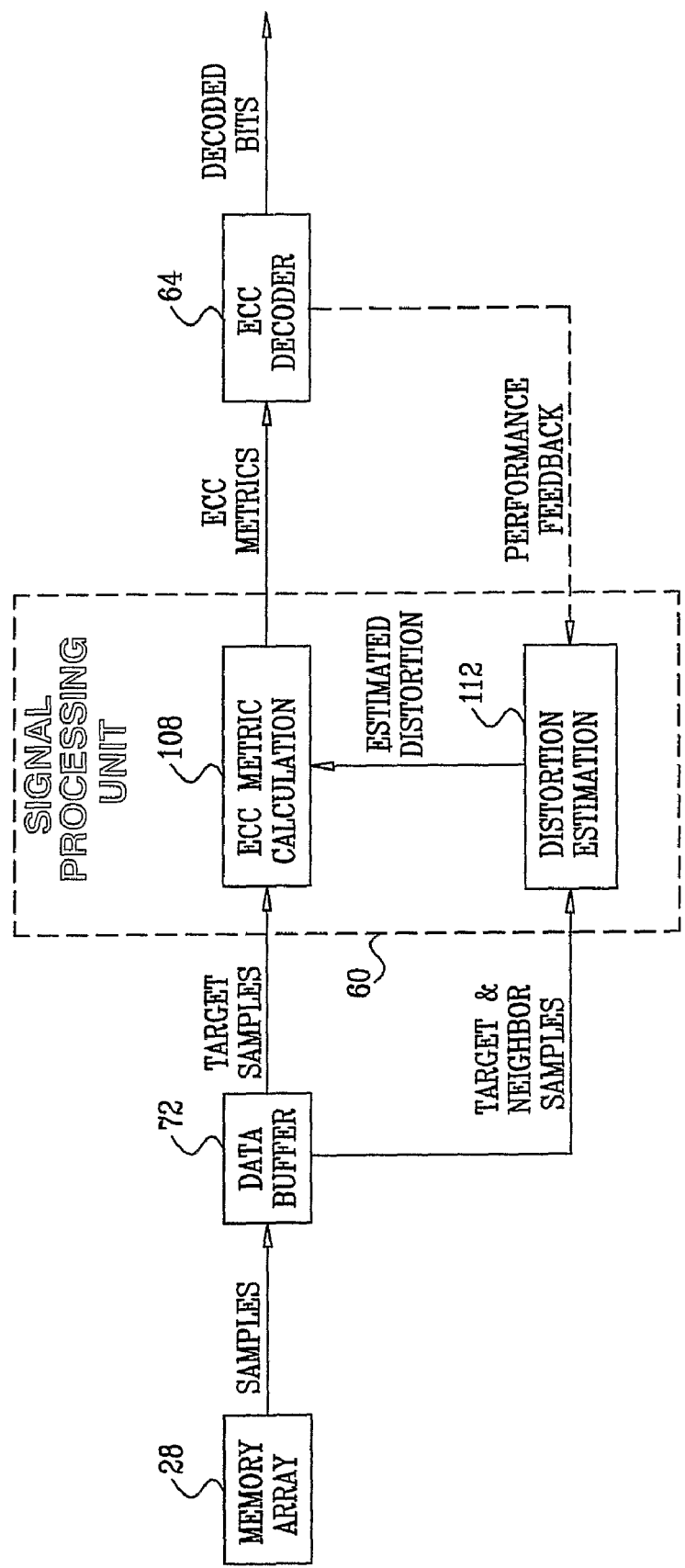
FIG. 4 is a functional block diagram that schematically illustrates a process for retrieving data from a memory cell array, in accordance with an embodiment of the present invention.

FIG. 4 is a functional block diagram that schematically illustrates a process for retrieving data from memory cell array 28, in accordance with an embodiment of the present invention. When reading data from memory device 24, R/W unit 40 produces digitized samples based on the voltage levels read from memory cells 32 of array 28. The samples are stored in data buffer 72.

In the context of the present patent application and in the claims, terms such as "reading data," "sampling voltages" and "reading voltages" mean either explicitly converting analog voltages stored in memory cells to digital samples, or accepting such samples over an interface. For example, when using a two-chip configuration such as shown in FIG. 1 above, these terms can refer to accepting samples, which were produced by an off-chip comparator or A/D converter, by the MSP.

The target samples (i.e., the samples of the memory cells whose data is requested by the host) are provided to a metric calculation module 108 in signal processing unit 60. The metric calculation module calculates ECC metrics of the target samples.

The target samples, as well as samples of other cells that may potentially cause distortion to the target cells, are provided to a distortion estimation module 112 in signal processing unit 60. Module 112 estimates the distortion contributed to the target cells, based on the samples of the target cells and of the potentially-interfering cells. Module 112 may carry out various methods for estimating the distortion. Exemplary estimation methods are described further below.

Module 112 may consider different numbers and types of potentially-interfering cells, depending on the type of distortion mechanism in question and on the estimation method being used. For example, in some embodiments module 112 estimates the cross-coupling interference to each cell from its eight neighbor cells in the array. In these embodiments, module 112 typically processes the page (row) being decoded, as well as the preceding and following pages. The data buffer in this case can be several pages in size.

In an alternative embodiment, module 112 may consider the distortion originating from only the left-hand-side and right-hand-side neighbors of a cell. In these embodiments, the data buffer may be smaller, on the order of a single page.

In some embodiments, module 112 estimates distortion, which is caused by cells in pages that are distant from the target cell. For example, back pattern noise may be contributed by cells on the same column as the target cell but on distant pages. In these embodiments, the content of such distant cells, or other information regarding these cells, may be provided to module 112.

In some cases, the samples read from the potentially-interfering cells can be stored and processed at a coarser quantization, i.e., at a smaller number of bits in comparison with the quantization of the samples of the target cells. The reduced quantization can reduce the size of the data buffer and the complexity of module 112.

Distortion estimation module 112 provides the estimated distortion to metric calculation module 108. The metric calculation module calculates the ECC metrics based on the estimated distortion, and provides the metrics to encoder/decoder 64. The ECC encoder/decoder decodes the ECC using the metrics, so as to reconstruct the data stored in the target memory cells.

In some embodiments, metric calculation module 108 defines a function over the sample values read from the target cells and over the decision thresholds. The function modifies the sample values with respect to the decision thresholds, so as to reduce the error probability of the ECC decoding process, given the distortion estimation provided by module 112. For example, referring to FIG. 3, the function evaluated by module 108 essentially warps the voltage axis, so as to map curves 100A . . . 100D to curves 92A . . . 92D, respectively. When the function operates on subsequent target samples, the bit decisions are taken based on shifted distributions 100A . . . 100D.

In some cases, feedback from the ECC decoding process (e.g., decoding success or failure) can be used to further improve the distortion estimation and metric calculation process. A data retrieval method that uses such feedback is described in FIG. 5 below.

The ECC decoder may consider and make joint decisions on sequences of cells. For example, the decoder may apply various Maximum Likelihood Sequence Estimation (MLSE) techniques, as are known in the art, for this purpose.

Iterative Distortion Estimation Using ECC Decoder Feedback

Figure 5:
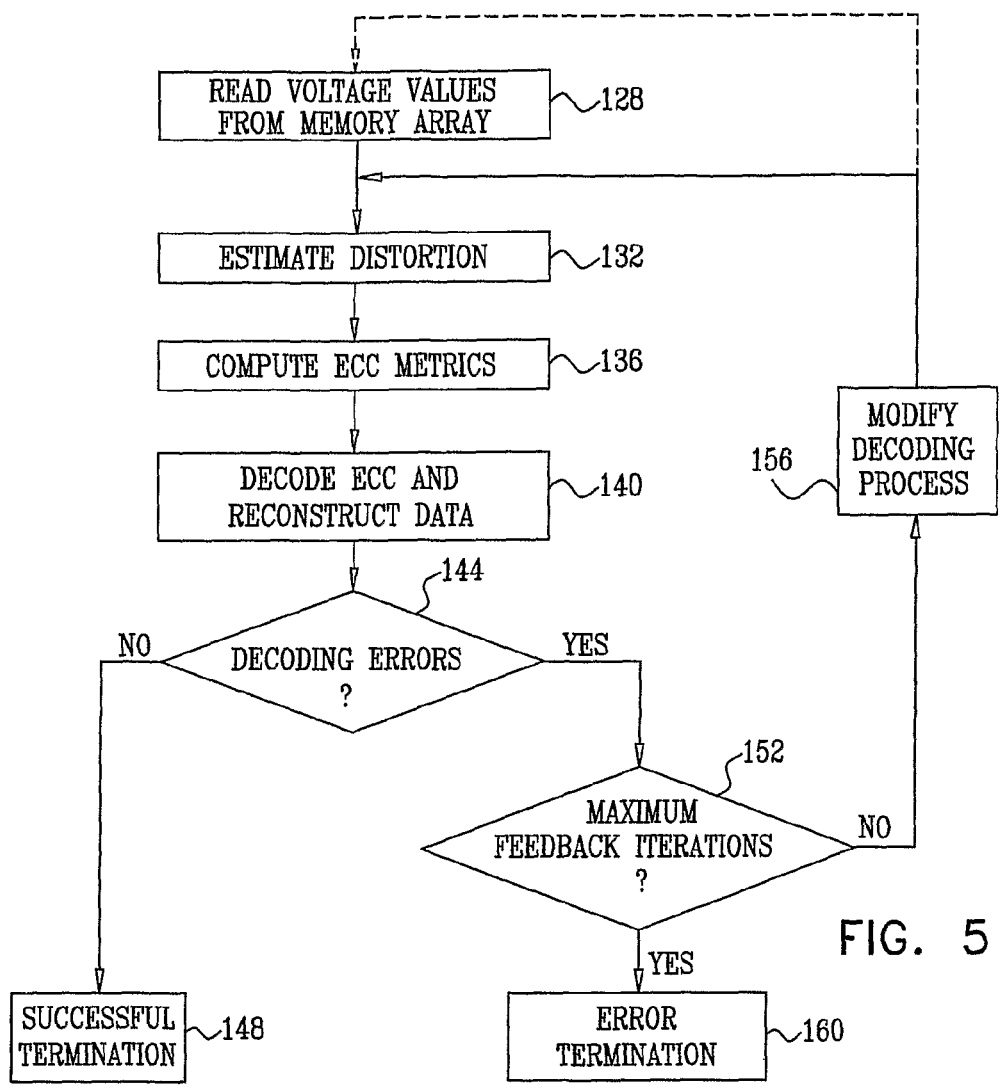
FIG. 5 is a flow chart that schematically illustrates a method for retrieving data from a memory cell array, in accordance with another embodiment of the present invention.

FIG. 5 is a flow chart that schematically illustrates a method for retrieving data from memory cell array 28, in accordance with another embodiment of the present invention. Steps 128-140 of the method describe a process that is similar to the process of FIG. 4 above. Steps 144-156 that follow perform an iterative adaptation of the decoding process based on feedback from the ECC decoding process.

The method begins with R/W unit 40 reading the voltages of the desired target cells and from the potentially-interfering cells in array 28, at a reading step 128. Signal processing unit 60 estimates the distortion present in the read voltages, at a distortion estimation step 132. Unit 60 calculates the ECC metrics, at a metric calculation step 136. Unit 60 can use any ECC metric and any distortion estimation method, such as the methods described herein. ECC encoder/decoder 64 decodes the ECC and reconstructs the stored data, at a decoding step 140.

ECC encoder/decoder 64 notifies unit 60 (or controller 76) whether the page was decoded successfully, i.e., whether the decoded page contains errors or not. If the decoding was successful, as checked at a success checking step 144, the method terminates successfully, as a successful termination step 148. Unit 60 may use different methods to verify whether the decoded page contains errors. For example, unit 60 may check whether the decoder output is a valid codeword. Alternatively, one or more checksum bits, such as a Cyclic Redundancy Check (CRC), may be stored together with the data. Unit 60 can calculate the CRC over the decoded data and compare it with the stored CRC value. Further alternatively, unit 60 may calculate a reliability metric of the decoded data and compare it with a predetermined threshold.

In the present example, only a certain maximum number of feedback iterations is allowed in order to avoid endless loop, deadlock situations. Thus, when the feedback from the ECC decoder indicates that the decoded page contains errors, unit 60 (or controller 76) checks whether the maximum number of iterations has already been performed, at an iteration checking step 152. If the maximum number of iterations has already been exhausted, the method terminates without successfully decoding the data, at an error termination step 160.

Otherwise, the ECC decoder adapts the decoding process, at a feedback adaptation step 156. For example, the ECC decoder can mark the LLR values that produced the lowest error probabilities. Unit 60 then uses this information to mark the target samples having the lowest error probabilities. Alternatively, the decoder may mark bits having low confidence levels as "erasures," and update the erasure marks according to the decoding process results. Further alternatively, any other technique for adjusting or updating the decoding process using ECC decoder feedback can also be used. The method then loops back to distortion estimation step 132 above, and unit 60 re-estimates the distortion based on the provided feedback.

MSP 52 uses a certain set of voltage thresholds when decoding the data at decoding step 140 above. In some embodiments, when errors are detected at success checking step 144 above, unit 60 modifies the decoding process by adjusting the thresholds, in order to improve the decoding performance. Unit 60 may use any suitable method for adjusting the thresholds. For example, unit 60 may perform a gradient search, in which the thresholds values are incremented or decremented, depending on whether the error performance improves or degrades. Alternatively, the threshold values can be adjusted so as to minimize the number of read operations required. Additional threshold adaptation methods, which can be used to adjust the decision thresholds, are described in U.S. Provisional Patent Application 60/894,290, cited above.

Note that in some cases, adjusting the decision thresholds involves re-reading the cell voltages. For example, when the cell threshold voltages are read by applying different voltages to the word lines, as described above, the cells are re-read using the modified decision thresholds. When the cells are read using high resolution ADCs, re-reading of the cells is usually not necessary.

In some embodiments, unit 60 can select the threshold values on a cell-by-cell basis, to match the distortion characteristics of each individual cell. The possible thresholds can be pre-determined or adjusted in an adaptive manner. For example, assume that a certain group of cells is read in three decoding iterations, using three predetermined sets of thresholds denoted TH1 . . . TH3. In the present example, the following table lists the bit sequences produced by the three decoding iterations:

| | Bit sequence | | | | | | | | |
|---|---|---|---|---|---|---|---|---|---|
| TH1 | 1 | 0 | 1 | 1 | 0 | 1 | 1 | 1 | 0 |
| TH2 | 1 | 0 | 0 | 1 | 0 | 0 | 1 | 0 | 0 |
| TH3 | 1 | 0 | 1 | 0 | 0 | 1 | 1 | 0 | 0 |

For each bit in the sequence, one of the three threshold sets produced the lowest distortion level. The best-performing threshold set for each bit is given by the following table:

| Best performing threshold set | TH1 | TH1 | TH2 | TH2 | TH3 | TH3 | TH1 | TH1 | TH3 |
|---|---|---|---|---|---|---|---|---|---|

Unit 60 selects, for each bit in the sequence, the decoding result that used the best-performing threshold set. Thus, the decision results are given by the following table:

| Decision | 1 | 0 | 0 | 1 | 0 | 1 | 1 | 1 | 0 |
|---|---|---|---|---|---|---|---|---|---|

In alternative embodiments, unit 60 selects the thresholds on a cell-by-cell basis before ECC decoding. In these embodiments, the cells are read using multiple predetermined sets of thresholds prior to ECC decoding. Then, for each cell, the best-performing set of thresholds is used, according to the estimated distortion for this cell. The best-performing threshold set is applied for each cell to produce the input to the ECC decoder.

Alternatively to selecting the values decoded using the best-performing thresholds, unit 60 may combine data values, which were read in different iterations using different thresholds. For example, unit 60 may perform majority voting on the bit values decoded at different iterations.

Further alternatively, unit 60 can read the voltages from the cells using different thresholds, and combine the read values from the different iterations before decoding the ECC. In other words, for each cell, unit 60 can read the cell voltage using different thresholds and produce the ECC decoding metrics (e.g., LLR) based on the multiple read voltages. Then, the ECC is decoded using the metrics. In some embodiments, the cells are read using different thresholds in an iterative manner, until the ECC decoding is successful. In each iteration, the cell is read using a different threshold. The decoding metrics are computed or updated based on the voltages read from the cell in the different iterations. The process continues until the ECC is decoded successfully.

Although the description above referred to re-reading cells with different thresholds on a cell-by-cell basis, a single set of thresholds can be used for the entire page.

In some embodiments, MSP 52 comprises two or more different decoders having increasing performance. Higher performance decoders typically have higher complexity, draw more power and introduce a higher processing delay, with respect to simpler decoders. Initially, the MSP decodes the page using the least-complex decoder, and reverts to a higher-performance decoder only when decoding errors are detected. Using this method, the average power consumption and processing delay is reduced, since high performance and complexity decoders are invoked only when needed.

For example, the MSP may initially attempt to decode the data without any ECC decoding, and revert to using an ECC decoder when errors are detected. This technique can be used, for example, when the ECC scheme used by the MSP comprises a systematic code, i.e., a code that adds separate redundancy bits without modifying the uncoded information bits. As another example, the simpler decoder may comprise a hardware-implemented hard-decision Reed-Solomon (RS) decoder, whose inputs comprise memoryless cell-by-cell decisions. The higher-performance decoder may comprise a soft-decision RS decoder, which is implemented in software and uses high-resolution sampling of the cell voltages.

Another possibility for modifying the decoding process based on the feedback provided by the ECC decoder is to modify the resolution in which the voltage levels are read. The resolution can be modified, for example, by iteratively modifying the threshold voltages used for digitizing the voltages read from the memory cells, until successful decoding is achieved. As noted above, in some embodiments the voltages of potentially-interfering cells and the voltage of the interfered cell are read with different resolutions. In such cases, the reading resolution of the potentially-interfering cells, the interfered cell, or both, can be adapted.

Exemplary Distortion Estimation Methods

Signal processing unit 60 of MSP 52 can use any suitable method for estimating the distortion that is present in the voltages read from memory cells 32. Some exemplary methods are described in U.S. Provisional Patent Applications 60/747,106 and 60/885,024, cited above. Alternatively, any other suitable distortion estimation method can be used.

Figure 6:
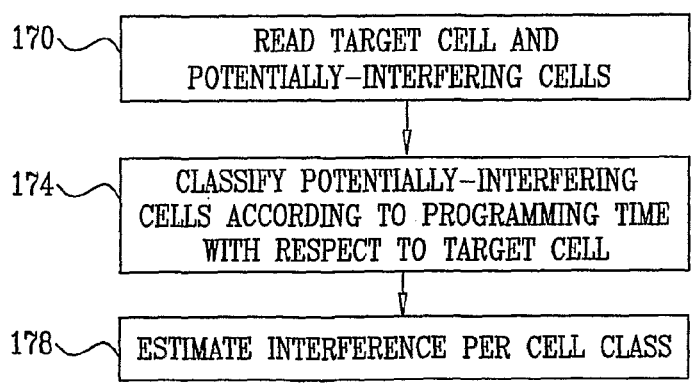
FIG. 6 is a flow chart that schematically illustrates a method for estimating distortion in a memory cell array, in accordance with an embodiment of the present invention.

FIG. 6 is a flow chart that schematically illustrates a method for estimating distortion in a memory cell array 28, in accordance with an embodiment of the present invention. The method described below can be used by distortion estimation module 112, such as in distortion estimation step 132 of the method of FIG. 5 above. The method uses the fact that distortion caused by cells that were programmed earlier than the target cell may differ from the distortion caused by cells that were programmed after the target cell.

Another assumption is that the array has been programmed using a Program and Verify (P&V) process, as is well known in the art. P&V processes are described, for example, by Jung et al., in "A 117 mm² 3.3V Only 128 Mb Multilevel NAND Flash Memory for Mass Storage Applications," IEEE Journal of Solid State Circuits, (11:31), November, 1996, pages 1575-1583, and by Takeuchi et al., in "A Multipage Cell Architecture for High-Speed Programming Multilevel NAND Flash Memories," IEEE Journal of Solid-State Circuits, (33:8), August 1998, pages 1228-1238, which are both incorporated herein by reference.

In some known P&V processes, each cell in a certain page is programmed to one of M voltage levels denoted 0 . . . M−1, wherein level 0 is the erased level. The P&V process programs the page in M phases. In phase i, a sequence of voltage pulses is applied to the cells whose programmed level should be i or higher. After each pulse, the process reads the voltages of the different cells and stops applying pulses to the cells that have reached their desired levels.

The method begins with MSP 52 accepting sampled voltages read from cells 28 of array 32, at a voltage reading step 170. The voltages comprise both the voltages of the target cells and the voltages of cells that potentially cause interference to the target cells. In the present example, the pages of array 28 are read in a sequential order, i.e., row by row, although other reading configurations can also be used.

For a given target cell, the potentially-interfering cells are classified according to the time of programming, at a classification step 174. A subset of cells 32, which is denoted D1, comprises potentially-interfering cells, which were not yet fully programmed by the P&V process at the time the target cell was programmed. Cells in class D1 were at the erased level when the target cell was programmed, but may have been programmed since then.

In some programming schemes, cells are programmed in several stages. For example, in some programming methods of four-level cells, the Least Significant Bit (LSB) and the Most Significant Bit (MSB) are written in two separate steps. An exemplary method is described in the article by Takeuchi et al., cited above. In such methods, a cell may be programmed to an intermediate level at a certain point in time, and a future programming step brings the cell to its final programmed value. When such programming methods are used, class D1 is extended to include the cells that were either at the erased level or at an intermediate programming level when the target cell is programmed, but may have been programmed to their final value since then.

Another subset of cells 32, denoted D2, comprises potentially-interfering cells, which were already programmed at the time the target cell was programmed. Since the interference from these cells to the target cell was already present when the target cell was programmed, the P&V process already compensated for this interference, at least partially, unless the target cell is erased, in which case the P&V algorithm was not applied to it. A third class of cells, denoted D3, comprises potentially-interfering cells that are programmed concurrently with the target cell, e.g., cells on the same page as the target cell.

Signal processing unit 60 estimates the distortion to the target cell according to the different classes of potentially-interfering cells, at a class-based distortion estimation step 178. Let n and m denote the row and column number of the target cell in array 28, respectively. $x_{n,m}$ denotes the voltage of the target cell after it was written using the P&V process. $x_{i,j}$ denotes the voltage of the cell located in row i and column j at the time the target cell was programmed. $y_{n,m}$ denotes the cell voltage value read from the target cell, which differs from $x_{n,m}$ due to distortion. Similarly, $y_{i,j}$ denotes the cell voltage value read from the target cell, which differs from $x_{i,j}$ due to distortion.

The aggregate distortion present in $y_{n,m}$ can be estimated as $$e_{n,m} = \sum_{(i,j) \in D_1} h_{n,m,i,j}(y_{i,j} - x_{i,j}) + \qquad [10]$$

$$\sum_{(i,j) \in D_2} h_{n,m,i,j}(y_{i,j} - \hat{x}_{i,j}) + \sum_{(i,j) \in D_3} h_{n,m,i,j} \cdot \max\{y_{i,j} - y_{n,m}, 0\} + b$$

wherein $h_{n,m,i,j}$ denotes the cross-coupling interference coefficient from the interfering cell at row i and column j to the target cell at row n and column m. b denotes a constant bias term.

The cells in class D1 include cells that were programmed after the target cell was programmed. Therefore, the interference caused by these cells was not present at that time, and the P&V process could not have compensated for this distortion.

The cells in class D2 were already programmed when the target cell was programmed, and the distortion caused by these cells was already present when the P&V process programmed the target cell. Therefore, the P&V process has already (at least partially) compensated for this distortion when the target cell was programmed. Note that class D2 is empty when the target cell is erased, since in this case it was not processed by a P&V algorithm and the distortions from previously programmed cells was not compensated. Nevertheless, this compensation was correct at the time the target cell was programmed, and does not take into account aging or other effects that occurred between that time and the time in which the target cell was read. $\hat{x}_{i,j}$ in the second term of Equation [10] above is an estimate of the voltage, which was present in the interfering cell at the time the target cell was programmed.

Note that the first and second terms of Equation [10] differ from one another in the reason for the change in the interfering cell voltage between the time of programming and the time of reading: for the cells in class D1 to the voltage change is caused by additional programming, whereas in the cells in class D2 cells to the change is caused by distortion.

In some embodiments, $\hat{x}_{i,j}$ can be estimated by applying ECC decoding to the outputs of these cells. The ECC can help in correcting severe errors, such as errors caused by severe leakage, by recovering the set of bits that was written to the cell. Alternatively, $y_{i,j}-x_{i,j}$ in the second term of Equation [10] can be estimated using a memoryless function of $y_{i,j}$, such as $\alpha \cdot y_{i,j}$, which estimates the leakage error for cells whose voltage level is $y_{i,j}$. Alternatively, $y_{i,j}-x_{i,j}$ can be approximated by the average expected leakage from the cell.

The third term in Equation [10] above, which refers to the cells in class D3, assumes the use of a P&V process, which inherently compensates for the distortion caused by D3 cells that are programmed to levels that are the same as or lower than the target cell. When a potentially-interfering cell on the same page as the target cell is programmed to a higher level, this programming is performed in a later pass of the P&V process, after the target cell has already been fully programmed. Therefore, a significant part of the distortion caused by D3 cells having higher levels than the target cell will not be present at the time the target cell is programmed, and the P&V process will not be able to compensate for this part of the distortion.

In some cases, the number of P&V pulses used to program a certain cell may vary due to cell-to-cell tolerances and various reading and writing inaccuracies of the P&V process. As a result, certain cells can be faster to write from others, even for the same voltage level. When the target cell is faster to program than a certain interfering cell, the interference from this cell will not be accurately compensated for by the P&V process.

In some embodiments, Equation [10] above can be modified to compensate for these differences. The third term in Equation [10] can be written as $$\sum_{(i,j)\in D_3} h_{n,m,i,j} \cdot g(y_{i,j}, y_{n,m}) \quad [11]$$

wherein $$g(y_{i,j}, y_{n,m}) = \begin{cases} y_{i,j} - \tilde{x}_{n,m} - \Delta, & y_{i,j} \geq y_{n,m} \\ y_{i,j} - \hat{x}_{i,j} - \Delta, & y_{i,j} < y_{n,m} \end{cases} \quad [12]$$

In Equation [12], $\tilde{x}_{n,m}$ denotes the extracted value of $x_{n,m}$, e.g., by using the ECC decoding process, as described above. $\Delta$ denotes a factor that compensates for the fact that the target cell was faster to program than the interfering cell.

Equation [10] above assumes that the distortion depends only on the voltage change of the interfering cell and not on the voltage of the interfered cell. Equation [10] above also assumes that the distortion is linear, i.e., can be modeled as a constant multiplied by the voltage change of the interfering cell. In some practical scenarios, however, these two assumptions may not hold. In particular, in some cases the interference from a certain interfering cell to a certain interfered cell depends on both the voltage of the interfering cell and on the voltage of the interfered cell. In such cases, Equation [10] can be re-written more generally as $$e_{n,m} = \sum_{(i,j)\in D_1} f(y_{i,j}, x_{i,j}, y_{n,m}) + \sum_{(i,j)\in D_2} f(y_{i,j}, \hat{x}_{i,j}, y_{n,m}) + \sum_{\substack{(i,j)\in D \\ y_{i,j} > y_{n,m3}}} f(y_{i,j}, y_{n,m}, y_{n,m}) \quad [13]$$

wherein $f(t_i, t_f, r)$ denotes the distortion caused by an interfering cell whose voltage changes from $t_i$ to $t_f$, to an interfered cell whose voltage level is r.

In some cases, such as when cell voltages are affected by Back Pattern Dependency (BPD), the interfering cells are located along the same cell string or bit line as the interfered cell, and the distortion to a certain cell depends on the voltages of the cells located above it along the bit line.

In some cases, unit 60 may predict the distortion in a particular cell from known or previously-estimated distortion values of other cells. For example, cells located in close proximity to one another in the array may have similar or correlated distortion levels. As another example, when some of the distortion is caused by or propagated over the supply voltage, cells that share the same power supply (Vcc) circuitry may have similar distortion.

In some embodiments, unit 60 corrects the ECC metrics responsively to distortion that is caused by gain and bias errors in the sense amplifiers. When a certain memory cell is read, the sense amplifier transforms the current flowing through the cell into voltage. The voltage at the sense amplifier output should therefore satisfy $v=k_{SA}i$, wherein v denotes the output voltage, i denotes the cell current and $K_{SA}$ denotes the amplifier gain, which is assumed to be constant for all cells. In many practical cases, however, the gain of the sense amplifier is not constant. The amplifier may also introduce a bias error. Thus, the sense amplifier output voltage can be written as $v=(k_{SA}+\Delta_{SA})i+B_{SA}$, wherein $k_{SA}$ is constant, $\Delta_{SA}$ denotes a gain error and $B_{SA}$ denotes the bias error. $\Delta_{SA}$ and $B_{SA}$ may vary from one sense amplifier to another (i.e., from one bit line to another).

In some embodiments, unit 60 estimates the values of $\Delta_{SA}$ and $B_{SA}$ and modifies the ECC metrics based on the estimated sense amplifier parameters. For example, the LLR calculations of [4] or [5] above can be modified to account for different $\Delta_{SA}$ and $B_{SA}$ values by shifting and scaling the read voltage r in Equation [4], or the interval boundaries $V_a$ and $V_b$ in Equation [5].

For example, the read voltage r in Equation [4] above can be replaces with $r_0$, which is defined as $$r_0 = (r - B_{SA}) \cdot \frac{k_{SA}}{k_{SA} + \Delta_{SA}}.$$

Although the exemplary method of FIG. 6 referred to certain P&V process implementations, the method can be used, *mutatis mutandis*, with any other suitable P&V process.

Adaptation of the method for use with other types of P&V processes on the basis of the disclosed embodiments will be apparent to those skilled in the art.

In many known devices, one of the nominal voltage levels is defined as an "erased" level. In some known data storage methods and devices, cells that remain at the erased level do not participate in the P&V process. Therefore, these cells may suffer from cross-coupling interference from neighboring cells that is not corrected by the P&V process. This interference widens the erased level voltage distribution towards the next-higher level and increases the necessary margin. In many NAND Flash cells, the erased level has a negative voltage, whereas the other levels have positive voltages. In such known devices, it is often not possible to read negative voltages, and therefore impossible to read the exact voltage of an erased cell in order to correct the interference. In some embodiments, when MSP 52 detects that a certain memory cell has a slightly positive voltage level and determines that the distortion level for this cell is high, the MSP concludes that this cell is an erased cell whose voltage erroneously became positive due to the distortion. The MSP can compensate for the distortion in such cells, so as to reduce the necessary margin.

In NROM Flash cells, the voltage levels of erased cells are usually positive, so they can be read. Although the cross-coupling between the two sides of an NROM cell is typically compensated for by the P&V process, the distortion is not compensated for when one or both sides of the cell are erased. In such cases, MSP 52 can compensate for the distortion even when one or both of the cell sides are erased, and reduce the necessary margin.

Although the embodiments described herein mainly address retrieving data from multilevel cells (MLC), the principles of the present invention can also be used with single-level cells (SLC). Although the embodiments described herein mainly address retrieving data from solid-state memory devices, the principles of the present invention can also be used for storing and retrieving data in Hard Disk Drives (HDD) and other data storage media and devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for operating a memory device, comprising:
encoding data using an Error Correction Code (ECC) and storing the encoded data as first analog values in respective analog memory cells of the memory device;
after storing the encoded data, reading from the memory cells of the memory device in which the encoded data were stored respective second analog values, at least some of which differ from the respective first analog values;
estimating a distortion that is present in the second analog values;
computing error correction metrics with respect to the second analog values responsively to the estimated distortion; and
processing the second analog values using the error correction metrics in an ECC decoding process, so as to reconstruct the data.

2. The method according to claim 1, wherein computing the error correction metrics comprises evaluating, for each memory cell, one or more cell parameters indicative of the distortion, and computing the error correction metrics responsively to the cell parameters.

3. The method according to claim 2, wherein the cell parameters comprise at least one parameter selected from a group of parameters consisting of the analog values read from other memory cells, estimated cross-coupling coefficients of the other memory cells, parameters of a statistical distribution of the read second analog values, a number of previous programming and erasure cycles the memory cell has gone through, time durations that elapsed since the previous programming and erasure cycles, previous errors detected in the memory cell, an identity of a word line to which the memory cell is connected, an identity of a bit line to which the memory cell is connected, an estimated parameter of a sense amplifier coupled to the bit line to which the memory cell is connected and an environmental parameter.

4. The method according to claim 1, wherein processing the second analog values comprises dividing a range of possible values of the second analog values into multiple decision intervals and determining the respective decision intervals in which the second analog values fall, and wherein computing the error correction metrics comprises defining a function that modifies the second analog values relative to the decision intervals, so as to improve a performance of the ECC decoding process.

5. The method according to claim 1, wherein processing the second analog values comprises accepting feedback regarding a performance of the ECC decoding process, and modifying the ECC decoding process responsively to the feedback.

6. The method according to claim 5, wherein processing the second analog values comprises applying a first ECC decoding process having a first error performance, wherein accepting the feedback comprises accepting an indication of decoding errors in the data decoded using the first process, and wherein modifying the ECC decoding process comprises processing the second analog values using a second ECC decoding process having a second error performance better than the first error performance.

7. The method according to claim 5, wherein modifying the ECC decoding process comprises modifying a sampling resolution used in reading the second analog values.

8. The method according to claim 1, wherein processing the second analog values comprises comparing the second analog values to decision thresholds, and wherein modifying the ECC decoding process comprises modifying the decision thresholds.

9. The method according to claim 8, wherein modifying the decision thresholds comprises re-reading the second analog values from the memory cells using the modified decision thresholds.

10. The method according to claim 8, wherein comparing the second analog values to the decision thresholds comprises reading the second analog values at the memory device using the decision thresholds, and wherein modifying the decision thresholds comprises sending a command to the memory device requesting to modify the thresholds.

11. The method according to claim 8, wherein processing the second analog values comprises producing multiple estimates of the data stored in each memory cell by performing respective multiple iterations of the ECC decoding process using different sets of the decision thresholds, and reconstructing the data responsively to the multiple estimates of the data.

12. The method according to claim 11, wherein reconstructing the data comprises selecting one of the multiple estimates independently for each memory cell.

13. The method according to claim 1, wherein reading the second analog values comprises reading multiple instances of the second analog values using respective different sets of decision thresholds, and wherein computing the error correcting metrics comprises combining the multiple instances independently for each memory cell and computing the error correcting metrics based on the combined multiple instances.

14. The method according to claim 13, wherein reading and combining the multiple instances of the second analog values comprise iteratively obtaining additional instances of the second analog values and updating the error correcting metrics using the additional instances until successfully decoding the ECC.

15. The method according to claim 1, wherein for each memory cell, estimating the distortion comprises reading the second analog values from a subset of potentially-interfering memory cells that potentially contribute to the distortion in the second analog value read from the memory cell, and wherein computing the error correction metrics comprises evaluating the distortion contributed by the potentially-interfering memory cells.

16. The method according to claim 15, wherein evaluating the distortion contributed by the potentially interfering memory cells to the memory cell comprises approximating the distortion contributed by each potentially-interfering memory cell based on both the second analog value read from the potentially-interfering memory cell and on the second analog value read from the memory cell.

17. The method according to claim 15, wherein processing the second analog values comprises processing the second analog value of the memory cell at a first quantization level, and processing the second analog values read from the potentially-interfering memory cells at a second quantization level that is coarser than the first quantization level.

18. The method according to claim 17, wherein processing the second analog values comprises reading the second analog values at the first and second quantization levels by iteratively modifying a threshold of a circuit used for reading the second analog values.

19. The method according to claim 1, wherein storing the encoded data comprises writing the first analog values into the memory cells using a Program and Verify (P&V) process, and wherein estimating the distortion comprises classifying the potentially-interfering memory cells into at least two classes selected from a group of classes consisting of memory cells that were fully programmed earlier than the memory cell, memory cells that were fully programmed later than the memory cell and memory cells that were that were fully programmed concurrently with the memory cell by the P&V process, and calculating the aggregate distortion separately within each of the classes.

20. The method according to claim 1, wherein the memory cells comprise Flash memory cells.

21. The method according to claim 1, wherein the memory cells comprise Dynamic Random Access Memory (DRAM) cells.

22. The method according to claim 1, wherein the memory cells comprise Phase Change Memory (PCM) cells.

23. The method according to claim 1, wherein the memory cells comprise Nitride Read-Only Memory (NROM) cells.

24. The method according to claim 1, wherein the memory cells comprise Magnetic Random Access Memory (MRAM) cells.

25. The method according to claim 1, wherein the memory cells comprise Ferroelectric Random Access Memory (FRAM) cells.

26. The method according to claim 1, wherein the ECC comprises a block code.

27. The method according to claim 26, wherein the block code comprises one of a Bose-ChaudhuriHochquenghem (BCH) code and a Reed-Solomon (RS) code.

28. The method according to claim 26, wherein the block code comprises one of a Low-Density Parity Check (LDPC) code, a turbo-code and a Turbo Product Code (TPC).

29. The method according to claim 28, wherein the ECC decoding process comprises an iterative decoding process.

30. The method according to claim 1, wherein the ECC decoding process uses feedback produced by reading the second analog values.

31. The method according to claim 1, wherein the ECC decoding process comprises a Maximum Likelihood Sequence Estimation (MLSE) process.

32. The method according to claim 1, wherein the ECC comprises one of a convolutional code, a Trellis-Coded Modulation (TCM) code, a Bit Interleaved Coded Modulation (BICM) code and a concatenated code.

33. The method according to claim 1, wherein the error correction metrics comprise Likelihood Ratios (LRs).

34. The method according to claim 1, wherein the error correction metrics comprise Log Likelihood Ratios (LLRs).

35. The method according to claim 1, wherein estimating the distortion comprises predicting the distortion present in one of the memory cells based on the distortion present in other memory cells.

36. The method according to claim 1, wherein the memory cells are arranged in isolated groups of potentially-interfering cells, wherein estimating the distortion in each group comprises evaluating an inverse of a cross-coupling matrix representing mutual interference between pairs of the memory cells in the group, and wherein computing the error correction metrics comprises computing a distance between the inverse of the cross-coupling matrix applied to the first analog values, summed with average distortion levels in the respective memory cells in the group, and the inverse of the cross-coupling matrix applied to the second analog values.

37. The method according to claim 36, wherein the isolated groups comprise respective Nitride Read-Only Memory (NROM) cells, and wherein the potentially interfering cells in each group comprise first and second charge storage areas of the respective NROM cell.

38. The method according to claim 1, wherein the memory cells are arranged in isolated groups of potentially-interfering cells, wherein estimating the distortion in each group comprises evaluating a vector of average distortion levels in the respective memory cells in the group and a cross-coupling matrix representing mutual interference between pairs of the memory cells in the group, and wherein computing the error correction metrics comprises computing the metrics responsively to a difference between a vector of the second analog values read from the memory cells in the group and a product of the cross-coupling matrix and the vector of the average distortion levels.

39. The method according to claim 38, wherein the isolated groups comprise respective Nitride Read-Only Memory (NROM) cells, and wherein the potentially interfering cells in each group comprise first and second charge storage areas of the respective NROM cell.

40. The method according claim 1, wherein storing the encoded data comprises scrambling the encoded data and storing the scrambled data, and wherein processing the second analog values comprises descrambling the second analog values read from the memory cells.

41. The method according to claim 1, wherein storing the data comprises maintaining at least some of the memory cells at an erased level, and wherein reading the second analog values, estimating the distortion, computing the error correcting metrics and processing the second analog values comprise compensating for the distortion in the second analog values read from the memory cells that were maintained at the erased level.

42. A method for operating a memory device, comprising:
storing data as first analog values in respective analog memory cells of the memory device;
after storing the data, reading multiple instances of second analog values from the respective memory cells, each of the instances read by comparing the second analog values to a respective decision threshold;
estimating a distortion that is present in the second analog values; and
processing the multiple instances of the second analog values responsively to the estimated distortion, so as to reconstruct the data.

43. The method according to claim 42, wherein reading and processing the multiple instances comprise iteratively obtaining additional instances of the second analog values.

44. Apparatus for retrieving data that has been encoded using an Error Correction Code (ECC) and stored as first analog values in respective analog memory cells of a memory device, the apparatus comprising:
a reading unit, which is arranged to read from the analog memory cells of the memory device in which the encoded data were stored respective second analog values, at least some of which differ from the respective first analog values;
a signal processing unit, which is arranged to estimate a distortion that is present in the second analog values and to compute error correction metrics with respect to the second analog values responsively to the estimated distortion; and
a decoder, which is arranged to process the second analog values using the error correction metrics, so as to decode the ECC and reconstruct the data.

45. the Apparatus according to claim 44 wherein the signal processing unit is arranged to evaluate, for each memory cell, one or more cell parameters indicative of the distortion, and to compute the error correction metrics responsively to the cell parameters.

46. The apparatus according to claim 45, wherein the cell parameters comprise at least one parameter selected from a group of parameters consisting of the second voltages read from other memory cells, estimated cross-coupling coefficients of the other memory cells, parameters of a statistical distribution of the read second analog values, a number of previous programming and erasure cycles the memory cell has gone through, time durations that elapsed since the previous programming and erasure cycles, previous errors detected in the memory cell, an identity of a word line to which the memory cell is connected, an identity of a bit line to which the memory cell is connected, an estimated parameter of a sense amplifier coupled to the bit line to which the memory cell is connected and an environmental parameter.

47. The apparatus according to claim 44, wherein the decoder is arranged to divide a range of possible values of the second analog values into multiple decision intervals and to determine the respective decision intervals in which the second analog values fall, and wherein the signal processing unit is arranged to define a function that modifies the second analog values relative to the decision intervals based on the estimated distortion, so as to improve a performance of the decoder.

48. The apparatus according to claim 44, wherein the signal processing unit is arranged to accept feedback regarding a performance of the decoder, and to modify an operation of the decoder responsively to the feedback.

49. The apparatus according to claim 48, wherein the decoder is arranged to initially apply a first ECC decoding process having a first error performance, wherein the signal processing unit is arranged to accept an indication of decoding errors in the data decoded using the first decoding process, and to cause the decoder to process the second analog values using a second ECC decoding process having a second error performance better than the first error performance.

50. The apparatus according to claim 48, wherein the signal processing unit is arranged to modify a sampling resolution used by the reading unit for reading the second analog values responsively to the feedback.

51. The apparatus according to claim 44, wherein the decoder is arranged to compare the second analog values to decision thresholds, and wherein the signal processing unit is arranged to modify the operation of the decoder by modifying the decision thresholds responsively to the feedback.

52. The apparatus according to claim 51, wherein the reading unit is arranged to read the second analog values by comparing the second analog values to the decision thresholds, and wherein the signal processing unit is arranged to modify the decision thresholds by sending a command to the reading unit requesting to modify the thresholds.

53. The apparatus according to claim 51, wherein the signal processing unit is arranged to cause the reading unit to re-read the second analog values from the memory cells using the modified decision thresholds.

54. The apparatus according to claim 51, wherein the decoder is arranged to produce multiple estimates of the data stored in each memory cell by performing respective multiple decoding iterations using different sets of the decision thresholds, and to reconstruct the data responsively to the multiple estimates of the data.

55. The apparatus according to claim 54, wherein the decoder is arranged to reconstruct the data by selecting one of the multiple estimates independently for each memory cell.

56. The apparatus according to claim 44, wherein the reading unit is arranged to read multiple instances of the second analog values using respective different sets of decision thresholds, wherein the signal processing unit is arranged to combine the multiple instances independently for each memory cell and to compute the error correcting metrics based on the combined multiple instances.

57. The apparatus according to claim 56, wherein the reading unit, the signal processing unit and the decoder are arranged to iteratively obtain additional instances of the second analog values and to update the error correcting metrics using the additional instances until successfully decoding the ECC.

58. The apparatus according to claim 44, wherein the reading unit is arranged, for each memory cell, to read the second analog values from a subset of potentially-interfering memory cells that potentially contribute to the distortion in the second analog value read from the memory cell, and wherein the signal processing unit is arranged to evaluate the distortion contributed by the potentially interfering memory cells.

59. The apparatus according to claim 58, wherein the signal processing unit is arranged to approximate the distortion contributed by each potentially-interfering memory cell based on both the second analog value read from the potentially-interfering memory cell and on the second analog value read from the memory cell.

60. The apparatus according to claim 58, wherein the signal processing unit is arranged to process the second analog value of the memory cell at a first quantization level, and to process the second analog values read from the potentially-interfering memory cells at a second quantization level that is coarser than the first quantization level.

61. The apparatus according to claim 60, wherein the reading unit is arranged to compare the second analog values to a threshold, and to iteratively modify the threshold so as to read the second analog values at the first and second quantization levels.

62. The apparatus according to claim 44, wherein the first analog values were written into the memory cells using a Program and Verify (P&V) process, and wherein the signal processing unit is arranged to classify the potentially-interfering memory cells into at least two classes selected from a group of classes consisting of memory cells that were fully programmed earlier than the memory cell, memory cells that were fully programmed later than the memory cell and memory cells that were fully programmed concurrently with the memory cell by the P&V process, and to calculate the aggregate distortion separately within each of the classes.

63. The apparatus according to claim 44, wherein the reading unit resides in a first Integrated Circuit (IC) and wherein the signal processing unit and the decoder reside in a second IC different from the first IC.

64. The apparatus according to claim 44, wherein the reading unit, the signal processing unit and the decoder are integrated in a single device.

65. The apparatus according to claim 44, wherein the memory cells comprise Flash memory cells.

66. The apparatus according to claim 44, wherein the memory cells comprise Dynamic Random Access Memory (DRAM) cells.

67. The apparatus according to claim 44, wherein the memory cells comprise Phase Change Memory (PCM) cells.

68. The apparatus according to claim 44, wherein the memory cells comprise Nitride Read-Only Memory (NROM) cells.

69. The apparatus according to claim 44, wherein the memory cells comprise Magnetic Random Access Memory (MRAM) cells.

70. The apparatus according to claim 44, wherein the memory cells comprise Ferroelectric Random Access Memory (FRAM) cells.

71. The apparatus according to claim 44, wherein the ECC comprises a block code.

72. The apparatus according to claim 71, wherein the block code comprises one of a Bose-ChaudhuriHochquenghem (BCH) code and a Reed-Solomon (RS) code.

73. The apparatus according to claim 71, wherein the ECC comprises one of a Low-Density Parity Check (LDPC) code, a turbo-code and a Turbo Product Code (TPC).

74. The apparatus according to claim 73, wherein the decoder is arranged to decode the ECC using an iterative decoding process.

75. The apparatus according to claim 44, wherein the decoder is arranged to decode the ECC using feedback that is produced by reading the second analog values.

76. The apparatus according to claim 44, wherein the decoder is arranged to decode the ECC using a Maximum Likelihood Sequence Estimation (MLSE) process.

77. The apparatus according to claim 44, wherein the ECC comprises one of a convolutional code, a Trellis-Coded Modulation (TCM) code, a Bit Interleaved Coded Modulation (BICM) code and concatenated code.

78. The apparatus according to claim 77, wherein the reading unit and the signal processing unit are arranged to iteratively obtain additional instances of the second analog values.

79. The apparatus according to claim 44, wherein the error correction metrics comprise Likelihood Ratios (LRs).

80. The apparatus according to claim 44, wherein the error correction metrics comprise Log Likelihood Ratios (LLRs).

81. The apparatus according to claim 44, wherein the signal processing unit is arranged to predict the distortion present in one of the memory cells based on the distortion present in other memory cells.

82. The apparatus according to claim 44, wherein the memory cells are arranged in isolated groups of potentially-interfering cells, and wherein the signal processing unit is arranged to estimate the distortion in each group by evaluating an inverse of a cross-coupling matrix representing mutual interference between pairs of the memory cells in the group, and wherein computing the error correction metrics comprises computing a distance between the inverse of the cross-coupling matrix applied to the first analog values, summed with average distortion levels in the respective memory cells in the group, and the inverse of the cross-coupling matrix applied to the second analog values.

83. The apparatus according to claim 82, wherein the isolated groups comprise respective Nitride Read-Only Memory (NROM) cells, and wherein the potentially-interfering cells in each group comprise first and second charge storage areas of the respective NROM cell.

84. The apparatus according to claim 44, wherein the memory cells are arranged in isolated groups of potentially-interfering cells, and wherein the signal processing unit is arranged to estimate the distortion in each group by evaluating a vector of average distortion levels in the respective memory cells in the group and a cross-coupling matrix representing mutual interference between pairs of the memory cells in the group, and to compute the error correction metrics responsively to a difference between a vector of the second analog values read from the memory cells in the group and a product of the cross-coupling matrix and the vector of the average distortion levels.

85. The apparatus according to claim 84, wherein the isolated groups comprise respective Nitride Read-Only Memory (NROM) cells, and wherein the potentially-interfering cells in each group comprise first and second charge storage areas of the respective NROM cell.

86. The apparatus according to claim 44, wherein the data stored in the memory cells is scrambled, and wherein the signal processing unit is arranged to descramble the second analog values read from the memory cells.

87. The apparatus according to claim 44, wherein at least some of the memory cells are maintained at an erased level, and wherein the signal processing unit is arranged to compensate for the distortion in the second analog values read from the memory cells that were maintained at the erased level.

88. Apparatus for retrieving data that has been stored as first analog values in respective analog memory cells of a memory device, the apparatus comprising:
  a reading unit, which is arranged to read multiple instances of second analog values from the respective memory cells, each of the instances read by comparing the second analog values to a respective decision threshold; and
  a signal processing unit, which is arranged to estimate a distortion that is present in the second analog values and to process the multiple instances of the second analog values responsively to the estimated distortion, so as to reconstruct the data.

* * * * *